(12) United States Patent
Chambliss et al.

(10) Patent No.: US 11,131,611 B2
(45) Date of Patent: Sep. 28, 2021

(54) IMPACT TESTING APPARATUS AND METHODS

(71) Applicant: CORNING INCORPORATED, Corning, NY (US)

(72) Inventors: Kameron Isaiah Chambliss, Corning, NY (US); Benedict Osobomen Egboiyi, Painted Post, NY (US); Lisa Marie Noni, Horseheads, NY (US); Prakash Chandra Panda, Ithaca, NY (US); Kevin Barry Reiman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 182 days.

(21) Appl. No.: 16/122,214

(22) Filed: Sep. 5, 2018

(65) Prior Publication Data

US 2019/0072469 A1 Mar. 7, 2019

Related U.S. Application Data

(60) Provisional application No. 62/555,363, filed on Sep. 7, 2017.

(51) Int. Cl.
*G01N 3/30* (2006.01)
(52) U.S. Cl.
CPC ....... *G01N 3/30* (2013.01); *G01N 2203/0039* (2013.01)

(58) Field of Classification Search
CPC combination set(s) only.
See application file for complete search history.

(56) References Cited

U.S. PATENT DOCUMENTS

| | | | |
|---|---|---|---|
| 5,390,534 A * | 2/1995 | Feeney | G01N 3/30 73/12.14 |
| 8,348,115 B2 | 1/2013 | Wakayama | |
| 8,551,598 B1 | 10/2013 | Coltrane et al. | |
| 9,047,044 B2 | 6/2015 | Raff | |
| 9,089,962 B2 | 7/2015 | McCarty, II et al. | |
| 2014/0150525 A1 | 6/2014 | Okawa et al. | |
| 2017/0166478 A1 * | 6/2017 | Gross | C03C 23/007 |

FOREIGN PATENT DOCUMENTS

CN 103712794 A 4/2014

OTHER PUBLICATIONS

Xue et al. "An Experimental and Numerical Study of the Dynamic Fracture of Glass," Proceedings of the ASME 2013 International Technical Cofnerence, Jul. 16-18, 2013. pp. 1-9.

* cited by examiner

Primary Examiner — Xin Y Zhong
(74) Attorney, Agent, or Firm — Kapil U. Banakar

(57) ABSTRACT

Test apparatus and methods for impact testing specimens, including edge impact testing are disclosed. The apparatus and methods disclosed include a pendulum and a bob which are used to impact test specimens against an impacting object.

18 Claims, 18 Drawing Sheets

IMPACT TESTING APPARATUS AND METHODS

CROSS-REFERENCE TO RELATED APPLICATIONS

This application claims the benefit of priority of U.S. Provisional Application Ser. No. 62/555,363 filed on Sep. 7, 2017, the contents of which are relied upon and incorporated herein by reference in their entirety.

BACKGROUND

This disclosure relates to an impact testing apparatus and methods, and more particularly, to an apparatus and methods for impact testing specimens, such as glass-based articles.

Reliability testing of mobile electronic devices, for example, smart phones and tablets comprising glass-based covers, is important to developing an understanding of how the specimens will perform during their application lifetime. Device drop testing is commonly employed to gain an understanding of handheld electronic device (e.g. smartphone, tablets, laptops, etc.) reliability after drop events (e.g. dropping a phone in a parking lot). Damage or fracture to the cover glass of a handheld electronic device can result in a device that is not useable and/or that presents safety issues for the user.

Drop testing involves dropping real devices, and this mode of testing is only available when the device design has become finalized and the devices have been fabricated. However, this type of testing can become very expensive due to the cost of the devices. To address these drawbacks, surrogate test vehicles (reusable, mock-up devices that resemble device dimensions and weight) are used to simulate device for cover glass performance testing. These surrogate vehicles aid in understanding the capability of the cover glass to meet customer requirements and provide design feedback that aids in cover glass survivability (e.g., beveled cover design). However, building the surrogate test vehicles and performing the drop test is time-consuming and quite expensive. Thus, it would be desirable to provide a less time-consuming and inexpensive test on the concept of damage introduction and bending, as seen in most field failure modes.

SUMMARY

A first aspect of this disclosure pertains to an apparatus for impact testing an edge of a specimen comprising a pendulum including a bob attached to a pivot, the bob including the specimen; and an impacting object positioned with respect to the bob, such that when the bob is released to move towards the impacting object, the specimen contacts the impacting object.

Another aspect of this disclosure pertains to an apparatus for impact testing an edge of a specimen comprising a pendulum including a bob attached to a pivot, the bob having an equilibrium position; the bob including a base configured to secure the specimen having at least two ends, an inner surface and an outer surface and at least one edge; and an impacting object positioned with respect to the bob, and a fixture to hold the specimen to the base in a position such that when the bob is released from a position at an angle greater than zero from the equilibrium position, at least one of the inner surface, the outer surface and the at least one edge contacts the impacting object.

Another aspect of the disclosure pertains to a method of impact testing a specimen, the method comprising attaching the specimen having at least one edge and a major surface to a pendulum bob; and impacting the specimen attached to the pendulum bob with an impacting object.

According to embodiment (1), an apparatus is provided. The apparatus includes: a pendulum including a bob attached to a pivot, wherein the bob has an equilibrium position and wherein the bob includes a base configured to secure a specimen having at least two ends, an inner surface and an outer surface and at least one edge; and an impacting object positioned with respect to the bob, and a fixture to hold the specimen to the base in a position such that when the bob is released from a position at an angle greater than zero from the equilibrium position the bob moves toward the impacting object such that at least one of the inner surface, the outer surface and the at least one edge contacts the impacting object.

According to embodiment (2), the apparatus of embodiment (1) is provided, wherein the impacting object is fixed and does not move when the specimen contacts the impacting object.

According to embodiment (3), the apparatus of embodiments (1) or (2) is provided, wherein the fixture is configured to hold the specimen so that the at least one edge contacts the impacting object.

According to embodiment (4), the apparatus of embodiments (1) or (2) is provided, wherein the fixture is configured to hold the specimen so that the outer surface contacts the impacting object.

According to embodiment (5), the apparatus of any of embodiments (1) to (4) is provided, wherein the impacting object includes a roughened surface.

According to embodiment (6), the apparatus of embodiment (5) is provided, wherein the roughened surface comprises an abrasive sheet having an abrasive surface positioned to be placed in contact with the edge of the specimen.

According to embodiment (7), the apparatus of any of embodiments (1) to (6) is provided, wherein the bob and the base are connected to the pivot by a rod.

According to embodiment (8), the apparatus of embodiments (1) or (2) is provided, wherein the base is configured such that the specimen is held at an angle with respect to the impacting object such that the edge of the specimen contacts the impacting object.

According to embodiment (9), the apparatus of embodiments (1) or (2) is provided, wherein a portion of the impacting object is positioned at an angle with respect to the equilibrium position of the bob.

According to embodiment (10), the apparatus of embodiment (9) is provided, wherein the impacting object is wedge-shaped.

According to embodiment (11), the apparatus of embodiment (9) is provided, wherein the impacting object can be moved to different angular positions with respect to the equilibrium position of the bob.

According to embodiment (12), the apparatus of embodiment (11) is provided, wherein the impacting object is mounted on a hinge.

According to embodiment (13), the apparatus of embodiment (6) is provided, wherein the abrasive sheet comprises sandpaper having a grit size of about 180.

According to embodiment (14), the apparatus of embodiment (13) is provided, wherein the specimen is a sheet having a plane, the impacting object defines a plane, and the fixture is configured to hold the specimen so that the plane of the specimen and the plane of the impacting object are different, and the at least one edge contacts the impacting object when the bob is released from a position at an angle greater than zero from the equilibrium position.

According to embodiment (15), the apparatus of embodiment (4) is provided, the base having a first end and a second end, and a curved surface defining a radius of curvature between the first end and the second end; and a first fixture and a second fixture to hold the at least two ends of the specimen and to apply a force to bend the specimen about the curved surface and to conform the specimen to the radius of curvature.

According to embodiment (16), the apparatus of embodiment (15) is provided, wherein the bob and base are sized and shaped such that when the specimen is affixed to the base and when the bob is released from a position at an angle greater than zero from the equilibrium position, the specimen is subjected to a bending radius and an impact force that simulates a bending radius of a strengthened cover glass of an electronic device when the electronic device is dropped on a ground surface by a user of the electronic device.

According to embodiment (17), the apparatus of embodiment (15) is provided, wherein the radius of curvature provides a bending tensile force of 100 MPa.

According to embodiment (18), the apparatus of embodiment (15) is provided, wherein the radius of curvature is in a range of from 0.25 m to 1.5 m.

According to embodiment (19), the apparatus of embodiment (15) is provided, wherein the radius of curvature is in a range of from 0.5 m to 1 m.

According to embodiment (20), the apparatus of embodiment (15) is provided, wherein the first fixture and second fixture are spaced apart at a distance of a cover glass length for an electronic device.

According to embodiment (21), the apparatus of embodiment (15) is provided, wherein the first fixture and second fixture are spaced apart at a distance in the range of from 50 mm to 500 mm.

According to embodiment (22), the apparatus of embodiment (15) is provided, wherein the first fixture comprises a first clamp and the second fixture each comprises a second clamp.

According to embodiment (23), the apparatus of embodiment (22) is provided, wherein the first clamp and the second clamp comprise toggle clamps.

According to embodiment (24), a method is provided. The method includes: attaching a specimen having at least one edge and a major surface to a pendulum bob; and impacting the specimen attached to the pendulum bob with an impacting object.

According to embodiment (25), the method of embodiment (24) is provided, further comprising attaching the specimen to the pendulum bob to expose the at least one edge so that the at least one edge of the specimen contacts the impacting object when the pendulum bob is released from a non-equilibrium position.

According to embodiment (26), the method of embodiment (25) is provided, further comprising securing the specimen to the pendulum bob with a fixture.

According to embodiment (27), the method of embodiment (24) is provided, further comprising bending the specimen to provide a bent specimen having a radius of curvature and an apex on a contact surface; and impacting the bent specimen at the apex with an impacting object using a pendulum.

According to embodiment (28), the method of embodiment (27) is provided, wherein the bent specimen is attached to a pendulum bob.

According to embodiment (29), the method of embodiment (28) is provided, further comprising attaching the specimen to the pendulum bob with a fixture.

According to embodiment (30), the method of any of embodiments (27) to (29) is provided, wherein an abrasive sheet is placed in contact with the apex of the specimen prior to impacting the specimen at the apex.

According to embodiment (31), the method of any of embodiments (27) to (30) is provided, wherein the specimen is secured to a curved surface prior to impacting the apex with the impacting object.

According to embodiment (32), the method of any of embodiments (27) to (31) is provided, wherein the bent specimen comprises glass and the radius of curvature is in a range that simulates a bending radius of a strengthened cover glass of a mobile phone or tablet device when the mobile phone or tablet device is dropped on a ground surface by a user of the mobile phone or tablet device.

According to embodiment (33), an apparatus is provided. The apparatus includes: a pendulum including a bob attached to a pivot, the bob including a specimen; and an impacting object positioned with respect to the bob, such that when the bob is released to move towards the impacting object, an edge of the specimen contacts the impacting object.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
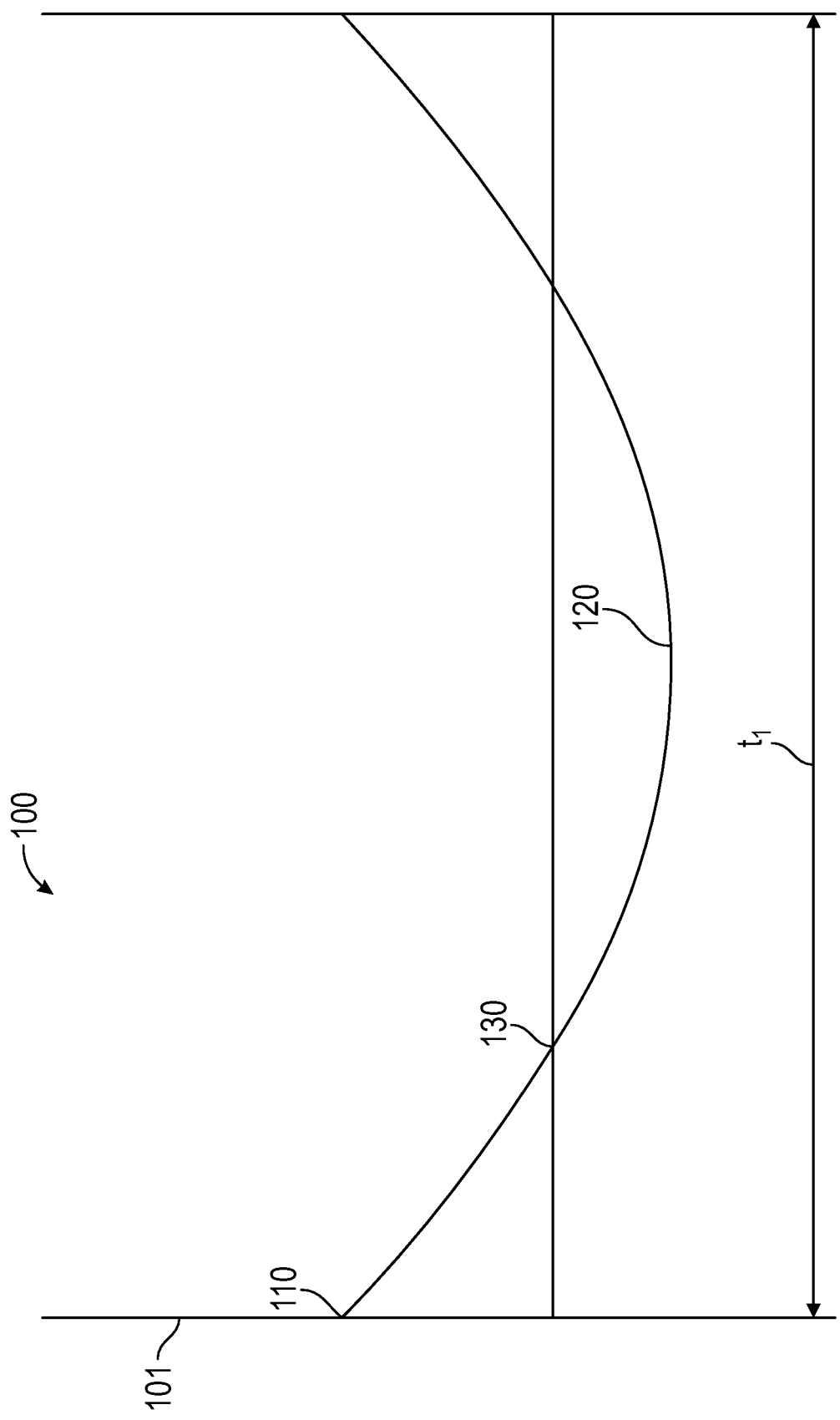
FIG. 1 is a cross-sectional view of a stress profile across a thickness of a thermally tempered glass article.

Reference will now be made in detail to various embodiments, examples of which are illustrated in the accompanying examples and drawings.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The disclosure pertains to methods and apparatus for impact testing specimens, such as glass-based articles which can be used as covers in mobile electronic devices such as tablets, smartphones and laptops.

The specimens for testing described herein include glass-based articles and glass-based substrates. As used herein, the terms "glass-based article" and "glass-based substrates" are used in their broadest sense to include any object made wholly or partly of glass. Glass-based articles include wholly glass materials, laminates of glass and non-glass materials, laminates of glass and crystalline materials, and glass-ceramic materials (including an amorphous phase and a crystalline phase). Unless otherwise specified, all compositions are expressed in terms of mole percent (mol %). Glass-based specimens according to one or more embodiments can be selected from soda-lime silicate glass (SLS), alkali-aluminosilicate glass, alkali-containing borosilicate glass, alkali-containing aluminoborosilicate glass, and alkali-free aluminosilicate glass. Glass-based substrates used as covers for mobile electronic devices are typically a chemically strengthened glass-based substrate having a compressive stress layer from the surface to a depth of compression (DOC).

As used herein, depth of compression (DOC) refers to the depth at which the stress within the glass-based article changes from compressive to tensile stress. At the DOC, the stress crosses from a positive (compressive) stress to a negative (tensile) stress (e.g., 130 in FIG. 1) and thus exhibits a stress value of zero.

According to the convention normally used in mechanical arts, compression is expressed as a negative (<0) stress and tension is expressed as a positive (>0) stress. Throughout this description, however, compressive stress (CS) is expressed as a positive or absolute value—i.e., as recited herein, CS=|CS|. In addition, tensile stress is expressed herein as a negative (<0) stress or absolute value—i.e., as recited herein, TS=|TS|. Central tension (CT) refers to tensile stress in the center of the glass-based article.

Unless otherwise specified, CT and CS are expressed herein in megaPascals (MPa), whereas thickness and depth of compression (DOC) are expressed in millimeters or microns (micrometers). CS and DOC are measured using those means known in the art, such as by scattering polarimetry using a SCALP-5 measurement system from Glasstress (Estonia). It is noted that the SCALP-5 measurement system is not capable of determining the stresses at the edges of the part, for example the edge regions extending from depths of 0-200 microns from the surface. This is due to the presence of excessive scattered light at the interface where the laser used in the metrology enters and exits the sample. However, in the interior of the sample the SCALP-5 measurement is able to accurately quantify the stress in the sample. Other possible techniques for measuring CS and DOC include a surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. DOC herein is measured by the SCALP-5 measurement system unless otherwise indicated.

Described herein are apparatus and methods for impact testing specimens such as thermally strengthened glass-based articles and chemically strengthened glass-based articles that include glasses, such as silicate glasses including alkali-containing glass, and glass-ceramics that may be used as a cover glass or housing for mobile electronic devices and touch-enabled displays. The glass-based articles may also be used in displays (or as display articles) (e.g., billboards, point of sale systems, computers, navigation systems, and the like), architectural articles (walls, fixtures, panels, windows, etc.), transportation articles (e.g., in automotive applications, trains, aircraft, sea craft, etc.), appliances (e.g., washers, dryers, dishwashers, refrigerators and the like), or any article that requires some fracture resistance.

In particular embodiments, the glass-based articles described herein are thin and exhibit stress profiles that are typically only achievable through tempering thick glass articles (e.g., having a thickness of about 2 mm or 3 mm or greater). The glass-based articles exhibit unique stress profiles along the thickness thereof. In some cases, the glass-based articles described herein exhibit a greater surface CS than tempered glass articles. In one or more embodiments, the glass-based articles have a compressive stress layer that extends deeper into the glass-based article (in which the CS decreases and increases more gradually than known chemically strengthened glass-based articles) such the glass-based article exhibits substantially improved fracture resistance, even when the glass-based article or a device including the same is dropped on a hard surface (e.g., granite) or a hard and rough surface (e.g., asphalt). The glass-based articles of one or more embodiments exhibit a greater maximum CT value than some known chemically strengthened glass articles.

As stated above, the glass-based articles described herein and subject to impact testing include glass-based articles chemically strengthened by ion exchange. Where specified, "glass-based articles" generally refer to "glass-based substrates" that have been strengthened (by, for example, ion exchange or thermal treatment). In an ion-exchange process, ions at or near the surface of the glass-based article are replaced by—or exchanged with—larger ions having the same valence or oxidation state. In those embodiments in which the glass-based article comprises an alkali aluminosilicate glass, ions in the surface layer of the glass and the larger ions are monovalent alkali metal cations, such as $Li^+$ (when present in the glass-based article), $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass-based substrate generate a stress in the resulting glass-based article.

Ion exchange processes are typically carried out by immersing a glass-based substrate in a molten salt bath (or two or more molten salt baths) containing the larger ions to be exchanged with the smaller ions in the glass-based substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass-based article in a salt bath (or baths), use of multiple salt baths, additional steps such as annealing, washing, and the like, are generally determined by the composition of the glass-based article (including the structure of the article and any crystalline phases present) and the desired DOC and CS of the glass-based article that results from strengthening. By way of example, ion exchange of glass-based substrates may be achieved by immersion of the glass-based substrates in at least one molten bath containing a salt such as, but not limited to, nitrates, sulfates, and chlorides of the larger alkali metal ion. Typical salts include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass thickness, bath temperature and glass (or monovalent ion) diffusivity. However, temperatures and immersion times different from those described above may also be used.

In one or more embodiments, the glass-based substrates may be immersed in a molten salt bath of 100% $NaNO_3$ having a temperature from about 370° C. to about 480° C. In some embodiments, the glass-based substrate may be immersed in a molten mixed salt bath including from about 5% to about 90% $KNO_3$ and from about 10% to about 95% $NaNO_3$. In some embodiments, the glass-based substrate may be immersed in a molten mixed salt bath including $Na_2SO_4$ and $NaNO_3$ and have a wider temperature range (e.g., up to about 500° C.). In one or more embodiments, the glass-based article may be immersed in a second bath, after immersion in a first bath. Immersion in a second bath may include immersion in a molten salt bath including 100% $KNO_3$ for 15 minutes to 8 hours.

In one or more embodiments, the glass-based substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass-based article. This spike can be achieved by single bath or multiple baths, with the bath(s) having a single composition or mixed composition, due to the unique properties of the glass compositions used in the glass-based articles described herein.

Glass-based articles often experience severe impacts that can introduce large flaws into a surface of such articles. Such flaws can extend to depths of up to about 200 micrometers from the surface. Traditionally, thermally tempered glass has been used to prevent failures caused by the introduction of such flaws into the glass because thermally tempered glass often exhibits large compressive stress (CS) layers (e.g., approximately 21% of the total thickness of the glass), which can prevent the flaws from propagating further into the glass, and thereby prevent failure. An example of a stress profile generated by thermal tempering is shown in FIG. 1. In FIG. 1, the thermally treated glass article 100 includes a first surface 101, a thickness $t_1$, and a surface CS 110. The thermally treated glass article 100 exhibits a CS that decreases from the first surface 101 to a depth of compression 130, and exhibits a maximum central tension (CT) 120.

Thermal tempering is currently limited to thick glass-based articles (i.e., glass-based articles having a thickness $t_1$ of about 3 millimeters or greater) because, to achieve the thermal strengthening and the desired residual stresses, a sufficient thermal gradient must be formed between the core of such articles and the surface. Such thick articles may be undesirable or not practical in certain applications such as display (e.g., consumer electronics, including mobile phones, tablets, computers, navigation systems, and the like), architecture (e.g., windows, shower panels, countertops etc.), transportation (e.g., automotive, trains, aircraft, sea craft, etc.), appliance, or any application that requires superior fracture resistance but thin and light-weight articles.

Figure 2:
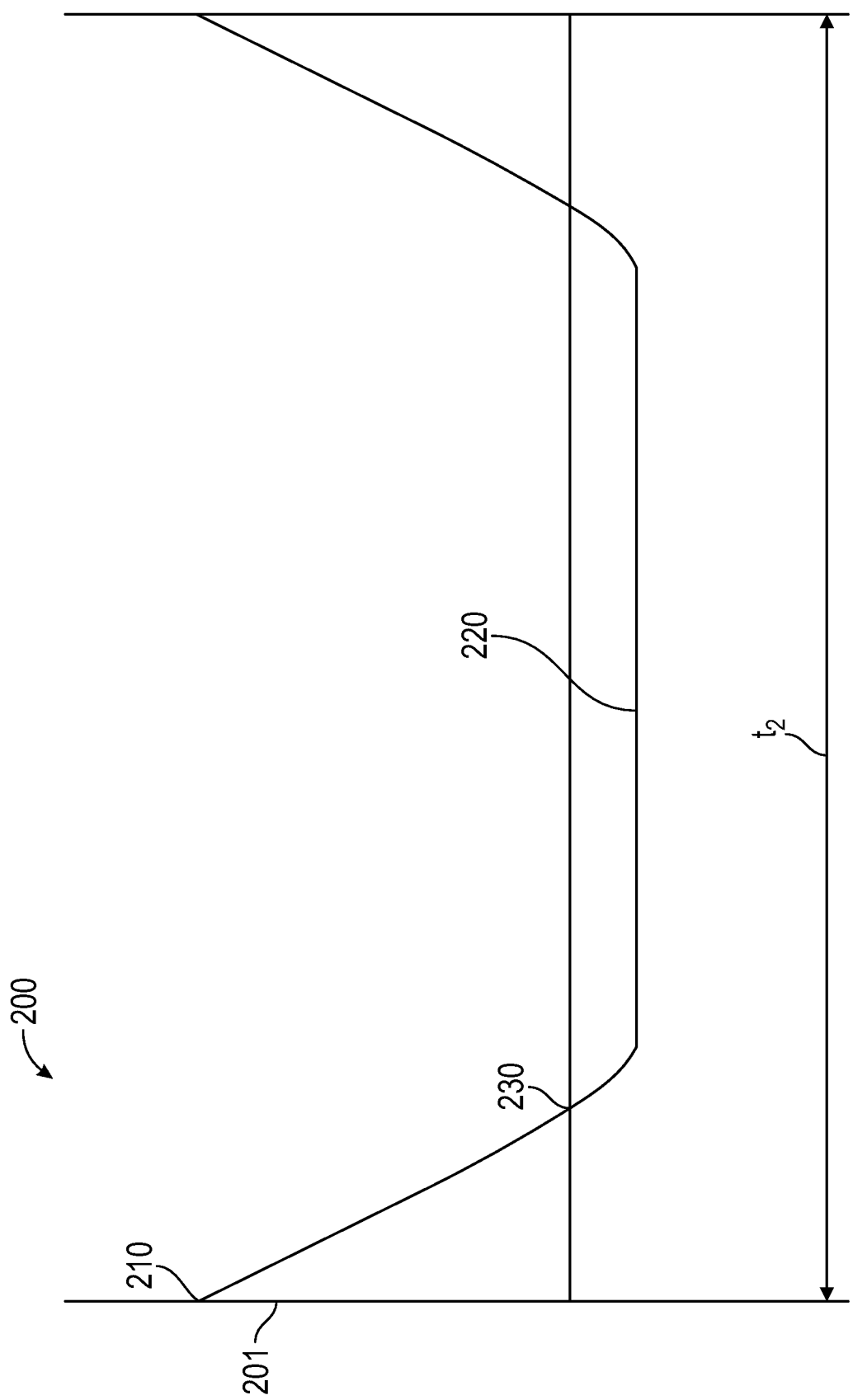
FIG. 2 is a cross-sectional view of a stress profile across a thickness of a chemically strengthened glass article.

Although chemical strengthening is not limited by the thickness of the glass-based article in the same manner as thermal tempering, chemically strengthened glass-based articles do not necessarily exhibit the stress profile of thermally tempered glass-based articles. An example of a stress profile generated by chemical strengthening (e.g., by an ion exchange process), is shown in FIG. 2. In FIG. 2, the chemically strengthened glass-based article 200 includes a first surface 201, a thickness t2 and a surface CS 210. The glass-based article 200 exhibits a CS that decreases from the first surface 201 to a DOC 230, and exhibits a maximum CT 220. As shown in FIG. 2, such profiles may exhibit a substantially flat CT region or CT region with a constant or near constant tensile stress along at least a portion of the CT region. Often, chemically strengthened glass-based articles exhibit a lower maximum CT value, as compared to the maximum central tension value shown in FIG. 1.

Figure 3:
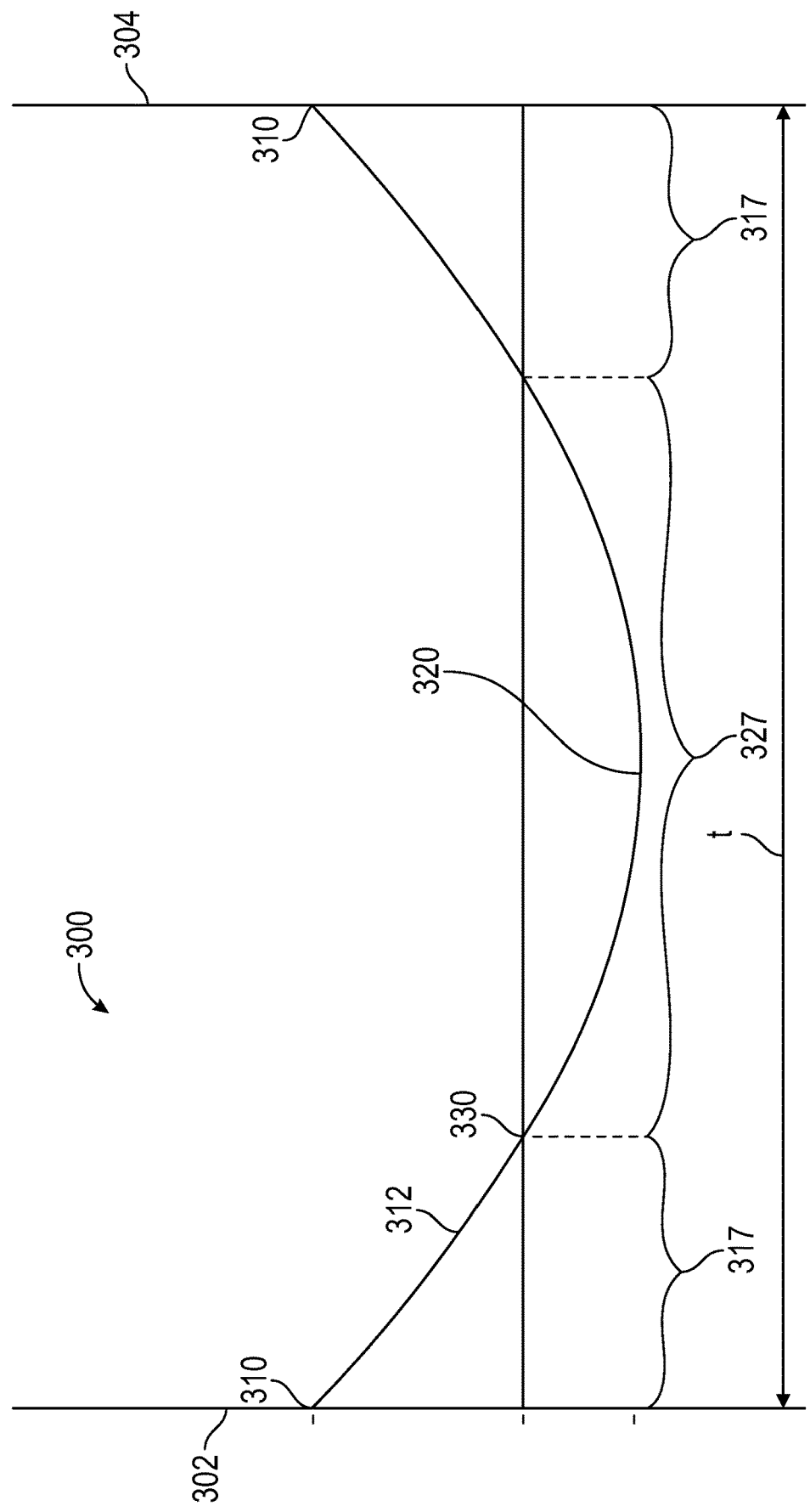
FIG. 3 is a cross-sectional view of a stress profile across a thickness of a chemically strengthened glass-based article according to one or more embodiments of this disclosure.

As illustrated in FIG. 3, the glass-based article 300 of one or more embodiments includes a first surface 302 and a second surface 304 opposing the first surface, defining a thickness t. In one or more embodiments, the thickness t may be about 3 millimeters or less (e.g., in the range from about 0.01 millimeter to about 3 millimeters, from about 0.1 millimeter to about 3 millimeters, from about 0.2 millimeter to about 3 millimeters, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter.)

The glass-based article includes a stress profile that extends from the first surface 302 to the second surface 304 (or along the entire length of the thickness t). In the embodiment shown in FIG. 3, the stress profile 312 as measured by SCALP as described herein is illustrated. The y-axis represents the stress value and the x-axis represents the thickness or depth within the glass-based article.

As illustrated in FIG. 3, the stress profile 312 includes a surface CS 310, a maximum CT 320, and a DOC 330. The stress profile 312 has a CS layer 317 extending from a surface 302 to the DOC 330. A second CS layer 317 extends from surface 304 to a second DOC. The stress profile 312 also has a CT layer 327 extending between the first and second DOC.

The surface CS 310 may be about 150 MPa or greater or about 200 MPa or greater (e.g., about 250 MPa or greater, about 300 MPa or greater, about 400 MPa or greater, about 450 MPa or greater, about 500 MPa or greater, or about 550 MPa or greater). The surface CS 310 may be up to about 900 MPa, up to about 1000 MPa, up to about 1100 MPa, or up to about 1200 MPa. The surface CS values provided herein may also comprise the maximum CS. In some embodiments, the surface CS is less than the maximum CS.

The maximum CT 320 may be less than about $71.5/\sqrt{(t)}$, where t is thickness in mm. In one or more embodiments, the maximum CT 320 may be greater than about $45/\sqrt{(t)}$. In one or more embodiments, the maximum CT 320 is about 80 MPa or less, such as about 75 MPa or less, about 70 MPa or less, about 60 MPa or less, about 55 MPa or less, about 50 MPa or less, or about 40 MPa or less. In one or more embodiments, the lower limit of the maximum CT 320 may be about 25 MPa, about 40 MPa, about 45 MPa, about 50 MPa, or about 60 MPa. In some embodiments, the maximum CT 320 may be in the range from about 25 MPa to about 80 MPa, such as from about 25 MPa to about 75 MPa, from about 25 MPa to about 70 MPa, from about 25 MPa to about 65 MPa, from about 40 MPa to about 80 MPa, from about 40 MPa to about 75 MPa, from about 40 MPa to about 70 MPa, from about 40 MPa to about 65 MPa, from about 45 MPa to about 80 MPa, from about 50 MPa to about 80 MPa, or from about 60 MPa to about 80 MPa.

The maximum CT 320 may be positioned at a range from about 0.3·t to about 0.7·t, from about 0.4·t to about 0.6·t or from about 0.45·t to about 0.55·t. It should be noted that any one or more of surface CS 310 and maximum CT 320 may be dependent on the thickness of the glass-based article. For example, glass-based articles having a thickness of about 0.8 mm may have a maximum CT of about 75 MPa or less. When the thickness of the glass-based article decreases, the maximum CT may increase. In other words, the maximum CT increases with decreasing thickness (or as the glass-based article becomes thinner).

Choice of substrates is not particularly limited. In some examples, the glass-based article may be described as having a high cation diffusivity for ion exchange. In one or more embodiments, the glass or glass-ceramic has fast ion-exchange capability, i.e., where diffusivity is greater than 450 $\mu m^2$/hour at 460° C., such as greater than 500 $\mu m^2$/hr at 460° C. In one or more embodiments, the glass or glass-ceramic exhibits a sodium ion diffusivity that is about 450 $\mu m^2$/hour or greater at 460° C., such as about 500 $\mu m^2$/hour or greater at 460° C. In one or more embodiments, the glass or glass-ceramic exhibits a potassium ion diffusivity that is about 450 $\mu m^2$/hour or greater at 460° C., such as about 500 $\mu m^2$/hour or greater at 460° C.

The glass-based article substrate may include a glass or a glass-ceramic. In one or more embodiments, the glass-based article substrate (prior to being chemically strengthened as described herein) may include a glass composition, in mole percent (mol %), including: $SiO_2$ in the range from about 40% to about 80%, $Al_2O_3$ in the range from about 10% to about 30%, $B_2O_3$ in the range from about 0% to about 10%, $R_2O$ in the range from about 0% to about 20%, and RO in the range from about 0% to about 15%. As used herein, $R_2O$ refers to the total amount of alkali metal oxides, including $Li_2O$, $Na_2O$, $K_2O$, $Rb_2O$, and $Cs_2O$. As used herein RO refers to the total amount of alkaline earth metal oxides, including MgO, CaO, SrO, BaO, and ZnO. In some instances, the composition may include at least one of $ZrO_2$ in the range from about 0 mol % to about 5 mol % and $P_2O_5$ in the range from about 0 mol % to about 15 mol %. In some embodiments, $TiO_2$ can be present from about 0 mol % to about 2 mol %.

In some embodiments, the glass composition may include $SiO_2$ in an amount, in mol %, in the range from about 45% to about 80%, such as from about 45% to about 75%, from about 45% to about 70%, from about 45% to about 65%, from about 45% to about 60%, from about 45% to about 65%, from about 45% to about 65%, from about 50% to about 70%, from about 55% to about 70%, from about 60% to about 70%, from about 70% to about 75%, from about 70% to about 72%, from about 50% to about 65%, from about 60% to about 65%, or any sub-ranges contained therein.

In some embodiments, the glass composition may include $Al_2O_3$ in an amount, in mol %, in the range from about 5% to about 30%, such as from about 5% to about 28%, from about 5% to about 26%, from about 5% to about 25%, from about 5% to about 24%, from about 5% to about 22%, from about 5% to about 20%, from about 6% to about 30%, from about 8% to about 30%, from about 10% to about 30%, from about 12% to about 30%, from about 14% to about 30%, about 15% to about 30%, from about 12% to about 18%, or any sub-ranges contained therein.

In one or more embodiments, the glass composition may include $B_2O_3$ in an amount, in mol %, in the range from about 0% to about 10%, such as from about 0% to about 8%, from about 0% to about 6%, from about 0% to about 4%, from about 0.1% to about 8%, from about 0.1% to about 6%, from about 0.1% to about 4%, from about 1% to about 10%, from about 2% to about 10%, from about 4% to about 10%, from about 2% to about 8%, from about 0.1% to about 5%, from about 1% to about 3%, or any sub-ranges contained therein. In some instances, the glass composition may be substantially free of $B_2O_3$. As used herein, the phrase "substantially free" with respect to the components of the composition means that the component is not actively or intentionally added to the composition, but may be present as an impurity in an amount less than about 0.01 mol %.

In some embodiments, the glass composition may include one or more alkali earth metal oxides, such as MgO, CaO and ZnO. In some embodiments, the total amount of the one or more alkali earth metal oxides may be a non-zero amount up to about 15 mol %. In one or more specific embodiments, the total amount of any of the alkali earth metal oxides may be a non-zero amount up to about 14 mol %, such as up to about 12 mol %, up to about 10 mol %, up to about 8 mol %, up to about 6 mol %, up to about 4 mol %, up to about 2 mol %, or up about 1.5 mol %. In some embodiments, the total amount, in mol %, of the one or more alkali earth metal oxides may be in the range from about 0.01% to 10%, such as from about 0.01% to 8%, from about 0.01% to 6%, from about 0.01% to 5%, from about 0.05% to 10%, from about 0.05% to 2%, from about 0.05% to 1%, or any sub-ranges contained therein. The amount of MgO may be in the range from about 0 mol % to about 5 mol %, such as from about 0.001 mol % to about 1 mol %, from about 0.01 mol % to about 2 mol %, from about 2 mol % to about 4 mol %, or any sub-ranges contained therein. The amount of ZnO may be in the range from about 0 mol % to about 2 mol %, such as from about 1 mol % to about 2 mol %, or any sub-ranges contained therein. The amount of CaO may be from about 0 mol % to about 2 mol %. In one or more embodiments, the glass composition may include MgO and may be substantially free of CaO and ZnO. In one variant, the glass composition may include any one of CaO or ZnO and may be substantially free of the others of MgO, CaO and ZnO. In one or more specific embodiments, the glass composition may include only two of the alkali earth metal oxides of MgO, CaO and ZnO and may be substantially free of the third of the earth metal oxides.

The total amount, in mol %, of alkali metal oxides $R_2O$ in the glass composition may be in the range from about 5% to about 20%, such as from about 5% to about 18%, from about 5% to about 16%, from about 5% to about 15%, from about 5% to about 14%, from about 5% to about 12%, from about 5% to about 10%, from about 5% to about 8%, from about 5% to about 20%, from about 6% to about 20%, from about 7% to about 20%, from about 8% to about 20%, from about 9% to about 20%, from about 10% to about 20%, from about 11% to about 20%, from about 12% to about 18%, from about 14% to about 18%, or any sub-ranges contained therein.

In one or more embodiments, the glass composition includes $Na_2O$ in an amount in the range from about 0 mol % to about 18 mol %, such as from about 0 mol % to about 16 mol %, from about 0 mol % to about 14 mol %, from about 0 mol % to about 12 mol %, from about 2 mol % to about 18 mol %, from about 4 mol % to about 18 mol %, from about 6 mol % to about 18 mol %, from about 8 mol % to about 18 mol %, from about 8 mol % to about 14 mol %, from about 8 mol % to about 12 mol %, from about 10 mol % to about 12 mol %, or any sub-ranges contained therein. In some embodiments, the composition may include at least about 4 mol % $Na_2O$.

In some embodiments, the amount of $Li_2O$ and $Na_2O$ is controlled to a specific amount or ratio to balance formability and ion exchangeability. For example, as the amount of $Li_2O$ increases, the liquidus viscosity may be reduced, thus preventing some forming methods from being used; however, such glass compositions are ion exchanged to deeper DOC levels, as described herein. The amount of $Na_2O$ can modify liquidus viscosity but can inhibit ion exchange to deeper DOC levels.

In one or more embodiments, the glass composition may include $K_2O$ in an amount less than about 5 mol %, such as less than about 4 mol %, less than about 3 mol %, less than about 2 mol %, or less than about 1 mol %. In one or more embodiments, the glass composition may be substantially free of $K_2O$.

In one or more embodiments, the glass composition may include $Li_2O$ in an amount about 0 mol % to about 18 mol %, such as from about 0 mol % to about 15 mol %, from about 0 mol % to about 10 mol %, from about 0 mol % to about 8 mol %, from about 0 mol % to about 6 mol %, from about 0 mol % to about 4 mol %, from about 0 mol % to about 2 mol %, or any sub-ranges contained therein. In some embodiments, the glass composition may include $Li_2O$ in an amount about 2 mol % to about 10 mol %, such as from about 4 mol % to about 10 mol %, from about 6 mol % to about 10 mol %, from about 5 mol % to about 8 mol %, or any sub-ranges contained therein. In one or more embodiments, the glass composition may be substantially free of $Li_2O$.

In one or more embodiments, the glass composition may include $Fe_2O_3$. In such embodiments, $Fe_2O_3$ may be present in an amount less than about 1 mol %, such as less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %, and all ranges and sub-ranges therebetween. In one or more embodiments, the glass composition may be substantially free of $Fe_2O_3$.

In one or more embodiments, the glass composition may include $ZrO_2$. In such embodiments, $ZrO_2$ may be present in an amount less than about 1 mol %, such as less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %, and all ranges and sub-ranges therebetween. In one or more embodiments, the glass composition may be substantially free of $ZrO_2$.

In one or more embodiments, the glass composition may include $P_2O_5$ in a range from about 0 mol % to about 10 mol %, such as from about 0 mol % to about 8 mol %, from about 0 mol % to about 6 mol %, from about 0 mol % to about 4 mol %, from about 0.1 mol % to about 10 mol %, from about 0.1 mol % to about 8 mol %, from about 2 mol % to about 8 mol %, from about 2 mol % to about 6 mol %, from about 2 mol % to about 4 mol %, or any sub-ranges contained therein. In some instances, the glass composition may be substantially free of $P_2O_5$.

In one or more embodiments, the glass composition may include $TiO_2$. In such embodiments, $TiO_2$ may be present in an amount less than about 6 mol %, such as less than about 4 mol %, less than about 2 mol %, or less than about 1 mol %. In one or more embodiments, the glass composition may be substantially free of $TiO_2$. In some embodiments, $TiO_2$ is present in an amount in the range from about 0.1 mol % to about 6 mol %, such as from about 0.1 mol % to about 4 mol %, or any sub-ranges contained therein.

In some embodiments, the glass composition may include various compositional relationships. For example, the glass composition may include a ratio of the amount of $Li_2O$ (in mol %) to the total amount of $R_2O$ (in mol %) in the range from about 0 mol % to about 1 mol %, such as from about 0 mol % to about 0.5 mol %, from about 0 mol % to about 0.4 mol %, from about 0.1 mol % to about 0.5 mol %, from about 0.2 mol % to about 0.4 mol %, or any sub-ranges contained therein.

In some embodiments, the glass composition may include a difference between the total amount of $R_2O$ (in mol %) and the amount of $Al_2O_3$ (in mol %) ($R_2O—Al_2O_3$) in the range from about 0 mol % to about 5 mol %, such as from about 0 mol % to about 4 mol %, from about 0 mol % to about 3 mol %, from about 0.1 mol % to about 4 mol %, from about 0.1 mol % to about 3 mol %, from about 0.1 mol % to about 2 mol %, from about 1 mol % to about 2 mol %, or any sub-ranges contained therein.

In some embodiments, the glass composition may include a difference between the total amount of $R_xO$ (in mol %) and the amount of $Al_2O_3$ (in mol %) ($R_xO—Al_2O_3$) in the range from about 0 mol % to about 5 mol %, such as from about 0 mol % to about 4 mol %, from about 0 mol % to about 3 mol %, from about 0.1 mol % to about 4 mol %, from about 0.1 mol % to about 3 mol %, from about 1 mol % to about 3 mol %, from about 2 mol % to about 3 mol %, or any sub-ranges contained therein. As used herein, $R_xO$ includes $R_2O$ and RO.

In some embodiments, the glass composition may include a ratio of the total amount of $R_2O$ (in mol %) to the amount of $Al_2O_3$ (in mol %) ($R_2O/Al_2O_3$) in the range from about 0 to about 5, such as from about 0 to about 4, from about 0 to about 3, from about 1 to about 4, from about 1 to about 3, from about 1 to about 2, or any sub-ranges contained therein.

In one or more embodiments, the glass composition includes a combined amount of $Al_2O_3$ and $Na_2O$ greater than about 15 mol %, such as greater than about 18 mol %, greater than about 20 mol %, or greater than about 23 mol %. The combined amount of $Al_2O_3$ and $Na_2O$ may be up to and including about 35 mol %, such as up to and including about 32 mol %, or up to and including about 30 mol %.

The glass composition of one or more embodiments may exhibit a ratio of the amount of MgO (in mol %) to the total amount of RO (in mol %) in the range from about 0 to about 2.

In some embodiments, glass composition may be substantially free of nucleating agents. Examples of typical nucleating agents are $TiO_2$, $ZrO_2$ and the like. Nucleating agents may be described in terms of function in that nucleating agents are constituents in the glass can initiate the formation of crystallites in the glass.

In some embodiments, the compositions used for the glass substrate may be batched with from about 0 mol % to about 2 mol % of at least one fining agent selected from a group that includes $Na_2SO_4$, NaCl, NaF, NaBr, $K_2SO_4$, KCl, KF, KBr, and $SnO_2$. The glass composition according to one or more embodiments may further include $SnO_2$ in the range from about 0 mol % to about 2 mol %, such as from about 0 mol % to about 1 mol %, from about 0.1 mol % to about 2 mol %, from about 0.1 mol % to about 1 mol %, from about 1 mol % to about 2 mol %, or any sub-ranges contained therein. The glass compositions disclosed herein may be substantially free of $As_2O_3$ and/or $Sb_2O_3$.

In one or more embodiments, the composition may specifically include from about 62 mol % to about 75 mol % $SiO_2$; from about 10.5 mol % to about 17 mol % $Al_2O_3$; from about 5 mol % to about 13 mol % $Li_2O$; from about 0 mol % to about 4 mol % ZnO; from about 0 mol % to about 8 mol % MgO; from about 2 mol % to about 5 mol % $TiO_2$; from about 0 mol % to about 4 mol % $B_2O_3$; from about 0 mol % to about 5 mol % $Na_2O$; from about 0 mol % to about 4 mol % $K_2O$; from about 0 mol % to about 2 mol % $ZrO_2$; from about 0 mol % to about 7 mol % $P_2O_5$; from about 0 mol % to about 0.3 mol % $Fe_2O_3$; from about 0 mol % to about 2 mol % $MnO_x$; and from about 0.05 mol % to about 0.2 mol % $SnO_2$.

In one or more embodiments, the composition may include from about 67 mol % to about 74 mol % $SiO_2$; from about 11 mol % to about 15 mol % $Al_2O_3$; from about 5.5 mol % to about 9 mol % $Li_2O$; from about 0.5 mol % to about 2 mol % ZnO; from about 2 mol % to about 4.5 mol % MgO; from about 3 mol % to about 4.5 mol % $TiO_2$; from about 0 mol % to about 2.2 mol % $B_2O_3$; from about 0 mol % to about 1 mol % $Na_2O$; from about 0 mol % to about 1 mol % $K_2O$; from about 0 mol % to about 1 mol % $ZrO_2$; from about 0 mol % to about 4 mol % $P_2O_5$; from about 0 mol % to about 0.1 mol % $Fe_2O_3$; from about 0 mol % to about 1.5 mol % $MnO_x$; and from about 0.08 mol % to about 0.16 mol % $SnO_2$.

In one or more embodiments, the composition may include from about 70 mol % to about 75 mol % $SiO_2$; from about 10 mol % to about 15 mol % $Al_2O_3$; from about 5 mol % to about 13 mol % $Li_2O$; from about 0 mol % to about 4 mol % ZnO; from about 0.1 mol % to about 8 mol % MgO; from about 0 mol % to about 5 mol % $TiO_2$; from about 0.1 mol % to about 4 mol % $B_2O_3$; from about 0.1 mol % to about 5 mol % $Na_2O$; from about 0 mol % to about 4 mol % $K_2O$; from about 0 mol % to about 2 mol % $ZrO_2$; from about 0 mol % to about 7 mol % $P_2O_5$; from about 0 mol % to about 0.3 mol % $Fe_2O_3$; from about 0 mol % to about 2 mol % $MnO_x$; and from about 0.05 mol % to about 0.2 mol % $SnO_2$.

In one or more embodiments, the composition may include from about 52 mol % to about 65 mol % $SiO_2$; from about 14 mol % to about 18 mol % $Al_2O_3$; from about 5.5 mol % to about 7 mol % $Li_2O$; from about 1 mol % to about 2 mol % ZnO; from about 0.01 mol % to about 2 mol % MgO; from about 4 mol % to about 12 mol % $Na_2O$; from about 0.1 mol % to about 4 mol % $P_2O_5$; and from about 0.01 mol % to about 0.16 mol % $SnO_2$. In some embodiments, the composition may be substantially free of any one or more of $B_2O_3$, $TiO_2$, $K_2O$ and $ZrO_2$.

In one or more embodiments, the composition may include at least 0.5 mol % $P_2O_5$, $Na_2O$, and, optionally, $Li_2O$, where $Li_2O$ (mol %)/$Na_2O$ (mol %)<1. In addition, these compositions may be substantially free of $B_2O_3$ and/or $K_2O$. In some embodiments, the composition may include ZnO, MgO, and/or $SnO_2$.

In some embodiments, the composition may comprise: from about 58 mol % to about 65 mol % $SiO_2$; from about 11 mol % to about 19 mol % $Al_2O_3$; from about 0.5 mol % to about 3 mol % $P_2O_5$; from about 6 mol % to about 18 mol % $Na_2O$; from 0 mol % to about 6 mol % MgO; and from 0 mol % to about 6 mol % ZnO. In certain embodiments, the composition may comprise from about 63 mol % to about 65 mol % $SiO_2$; from 11 mol % to about 17 mol % $Al_2O_3$; from about 1 mol % to about 3 mol % $P_2O_5$; from about 9 mol % to about 20 mol % $Na_2O$; from 0 mol % to about 6 mol % MgO; and from 0 mol % to about 6 mol % ZnO.

In some embodiments, the composition may include the following compositional relationship $R_2O$ (mol %)/$Al_2O_3$ (mol %)<2, where $R_2O=Li_2O+Na_2O$. In some embodiments, 65 mol %<$SiO_2$ (mol %)+$P_2O_5$ (mol %)<67 mol %. In certain embodiments, $R_2O$ (mol %)+R'O (mol %)−$Al_2O_3$ (mol %)+$P_2O_5$ (mol %)>−3 mol %, where $R_2O=Li_2O+Na_2O$ and R'O is the total amount of divalent metal oxides present in the composition.

Where the glass-based article includes a glass-ceramic, the crystal phases may include β-spodumene, rutile, gahnite, or other known crystal phases and combinations thereof.

The glass-based article may be substantially planar, although other embodiments may utilize a curved or otherwise shaped or sculpted substrate. In some instances, the glass-based article may have a 3D or 2.5D shape. As utilized herein, a "2.5D shape" refers to a sheet shaped article with at least one major surface being at least partially nonplanar, and a second major surface being substantially planar. As utilized herein, a "3D shape" refers to an article with first and second opposing major surfaces that are at least partially nonplanar. The glass-based article may be substantially optically clear, transparent, and free from light scattering. The glass-based article may have a refractive index in the range from about 1.45 to about 1.55. As used herein, the refractive index values are with respect to a wavelength of 550 nm.

Additionally or alternatively, the thickness of the glass-based article may be constant along one or more dimension or may vary along one or more of its dimensions for aesthetic and/or functional reasons. For example, the edges of the glass-based article may be thicker as compared to more central regions of the glass-based article. The length, width and thickness dimensions of the glass-based article may also vary according to the article application or use.

The glass-based article may be characterized by the manner in which it is formed. For instance, where the glass-based article may be characterized as float-formable (i.e., formed by a float process), down-drawable and, in particular, fusion-formable or slot-drawable (i.e., formed by a down draw process such as a fusion draw process or a slot draw process).

A float-formable glass-based article may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based article that can be lifted from the tin onto rollers. Once off the bath, the glass glass-based article can be cooled further and annealed to reduce internal stress. Where the glass-based article is a glass ceramic, the glass-based article formed from the float process may be subjected to a ceramming process by which one or more crystalline phases are generated.

Down-draw processes produce glass-based articles having a uniform thickness that possess relatively pristine surfaces. Because the average flexural strength of the glass-based article is controlled by the amount and size of surface flaws, a pristine surface that has had minimal contact has a higher initial strength. When this high strength glass-based article is then further strengthened (e.g., chemically), the resultant strength can be higher than that of a glass-based article with a surface that has been lapped and polished. Down-drawn glass-based articles may be drawn to a thickness of less than about 2 mm. In addition, down drawn glass-based articles have a very flat, smooth surface that can be used in its final application without costly grinding and polishing. Where the glass-based article is a glass ceramic, the glass-based article formed from the down draw process may be subjected to a ceramming process by which one or more crystalline phases are generated.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based article. The fusion draw method offers the advantage that, because the two glass films flowing over the channel fuse together, neither of the outside surfaces of the resulting glass-based article comes in contact with any part of the apparatus. Thus, the surface properties of the fusion drawn glass-based article are not affected by such contact. Where the glass-based article is a glass ceramic, the glass-based article formed from the fusion process may be subjected to a ceramming process by which one or more crystalline phases are generated.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous glass-based article and into an annealing region.

The glass-based article may be acid polished or otherwise treated to remove or reduce the effect of surface flaws.

Figure 4:
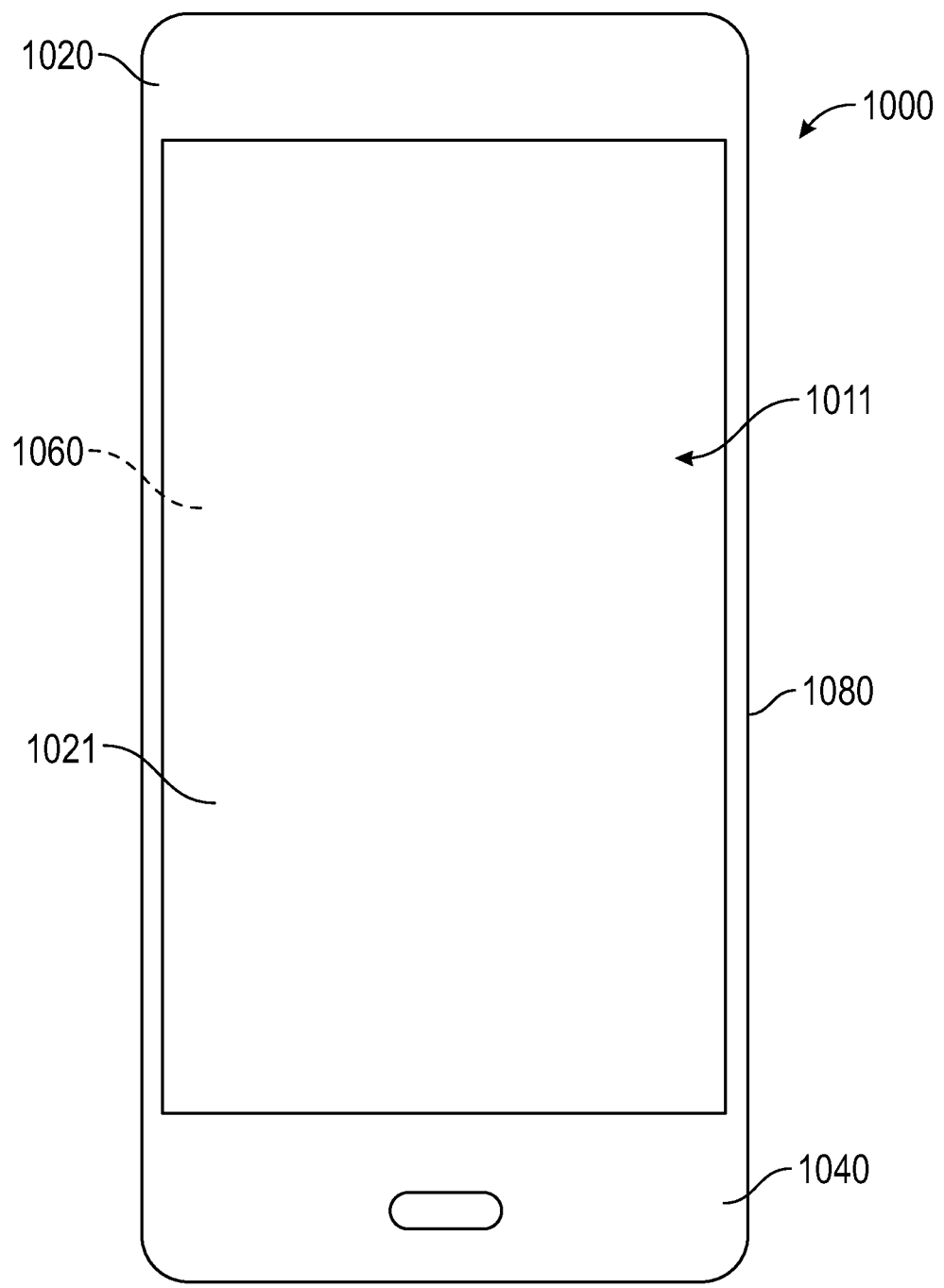
FIG. 4 is a front plan view of an electronic device incorporating one or more embodiments described herein.

Another aspect of this disclosure pertains to devices that include the glass-based articles described herein. For example, the devices may include any device including a display or requiring strengthened thin glass. In one or more embodiments the devices are electronic devices, which can include mobile devices such as mobile phones, laptops, tablets, music players, navigation devices and the like, or stationary devices such as computers, electronic displays, in vehicle information/entertainment systems, billboards, point of sale systems, navigation systems, and the like. In some embodiments, the glass-based articles described herein may be incorporated into architectural articles (walls, fixtures, panels, windows, etc.), transportation articles (e.g., glazing or interior surfaces in automotive applications, trains, aircraft, sea craft, etc.), appliances (e.g., washers, dryers, dishwashers, refrigerators and the like), or any article that requires some fracture resistance. As shown in FIG. 4, an electronic device 1000 may include a glass-based article 1011 according to one or more embodiments described herein. The device 1000 includes a housing 1020 having front 1040, back 1060, and side surfaces 1080; electrical components (not shown) that are at least partially inside or entirely within the housing and including at least a controller, a memory, and a display 1021 at or adjacent to the front surface of the housing. The glass-based article 1011 is shown as a cover disposed at or over the front surface of the housing such that it is over the display 1021. In some embodiments, the glass-based article may be used as a back cover or as a portion of the housing 1020.

Additional aspects of the disclosure relate to apparatus and methods for impact testing specimens. In some embodiments, the specimens may be categorized as "brittle." As used herein, "brittle" refers to a specimen that breaks without significant plastic deformation. Specimens may include glass-based specimens, such as glass specimens and glass-ceramic specimens. One or more embodiments of the disclosure may include measuring threshold failure impact force of a specimen. Thus, an aspect of the disclosure pertains to an apparatus for testing a surface of a glass-based specimen, for example a cover substrate for mobile electronic devices, such that a failure mode that has been observed to occur in the field is simulated. An exemplary failure mode is predominantly a combination of stress (bending) and damage introduction. This known failure mode is re-created herein using a component-level based surface impact test. Extensive testing has been conducted using this apparatus and it has been learned that certain glass-based compositions and ion exchange stress profiles can improve cover substrate survivability. In one or more embodiments, the specimen that is tested comprises a sheet. As used herein, "sheet" refers to a relatively thin, flat piece of material having a thickness defined by two opposing major surfaces.

In one or more embodiments, the apparatus comprises a pendulum-based dynamic impact test, where the test specimen is part of or comprises the bob of the pendulum. The apparatus is configured to cause the test specimen to contact a surface of an impacting object, which can be a smooth or roughened surface. In one or more embodiments, to perform the test, the test specimen is loaded on a holder and then pulled backwards from the pendulum equilibrium position and released to make a dynamic impact on the impact surface. The test mimics a drop event, such that the test specimen is the moving part and the impact surface is the stationary part. When the test specimen is in the form of a sheet, the test specimen can contact the impact surface at a major surface of the sheet or an edge of the sheet. The edge can be a straight edge, a curved edge, or a chamfered edge. In some embodiments, the edge may be a curved edge, as in a 2.5D cover for mobile electronic devices. In one or more embodiments, when the specimen contacts the impact surface at a major surface, the specimen is bent to provide a curved surface. A curved surface may be employed to simulate a bending stress observed in field failures. According to one or more embodiments of the apparatus, the specimen is the moving part, and travels to strike the impacting object, which is the stationary part, replicative of a device (moving part) dropped from a given height onto a surface (stationary part).

Failure mode is known to vary with the speed of damage introduction and bending rate. Unlike other quasi-static load application based component-level tests, such as ring-on-ring (ROR), indentation fracture threshold (IFT), and abraded ring-on-ring (ARoR) used to characterize glass performance, the embodiments of the apparatus and methods described herein are dynamic in nature. Furthermore, with the increasing demand for thin cover materials (e.g., a sheet) in mobile device applications becoming very popular, the need to have a component level test to evaluate different thin materials has become important. The methods and apparatus according to one or more embodiments can be used in the prediction of the potential drop performance response of thin glass-based substrates or articles such as glass-based cover sheets used in mobile electronic devices. According to one or more embodiments, the test methods and apparatus enable quicker estimation of glass-based article impact energy and associated impact force, which compares well to those generated from a system level drop test.

Figure 8:
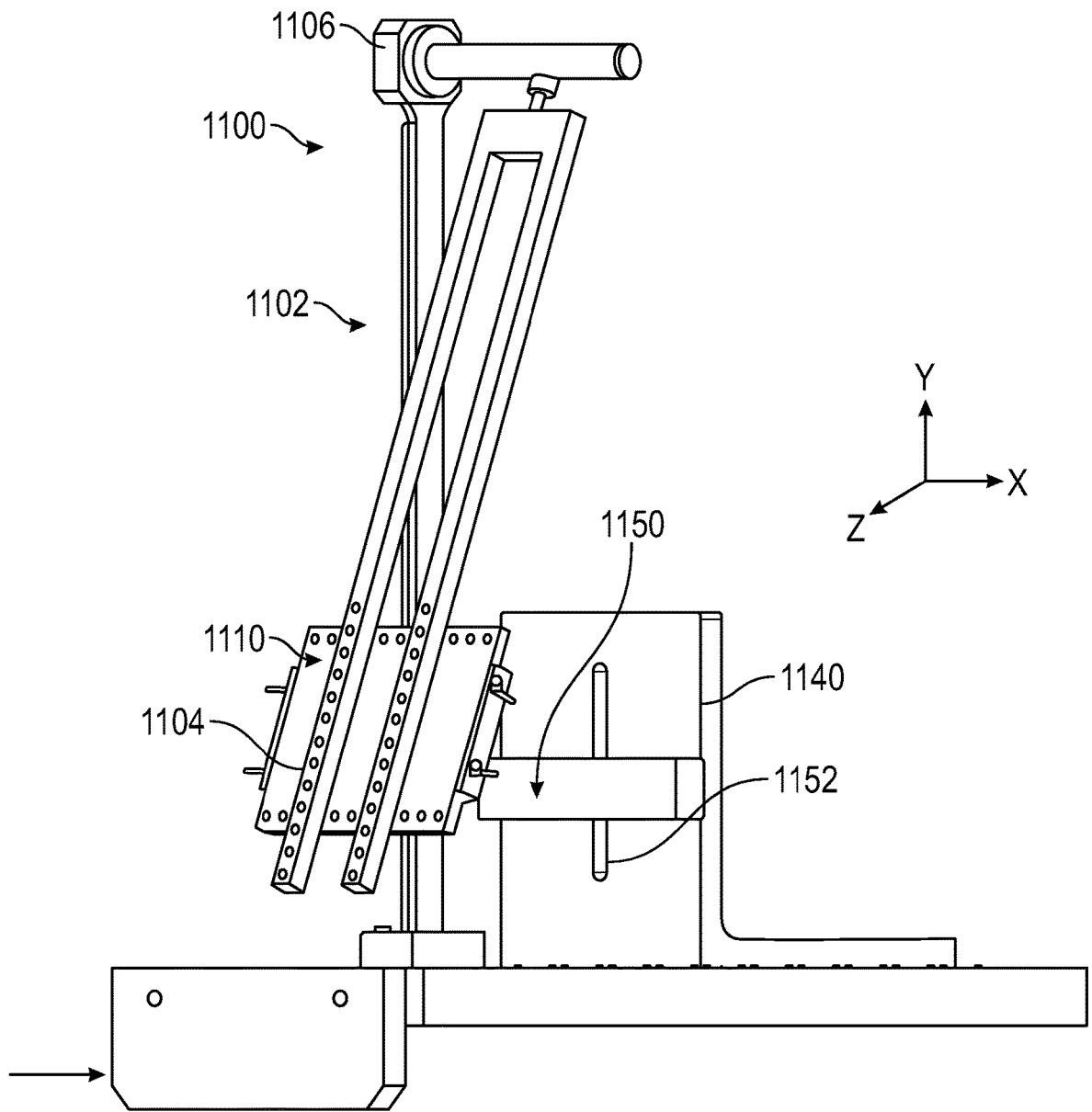
FIG. 8 is a front perspective view of the testing apparatus shown in FIG. 5.
Figure 9:
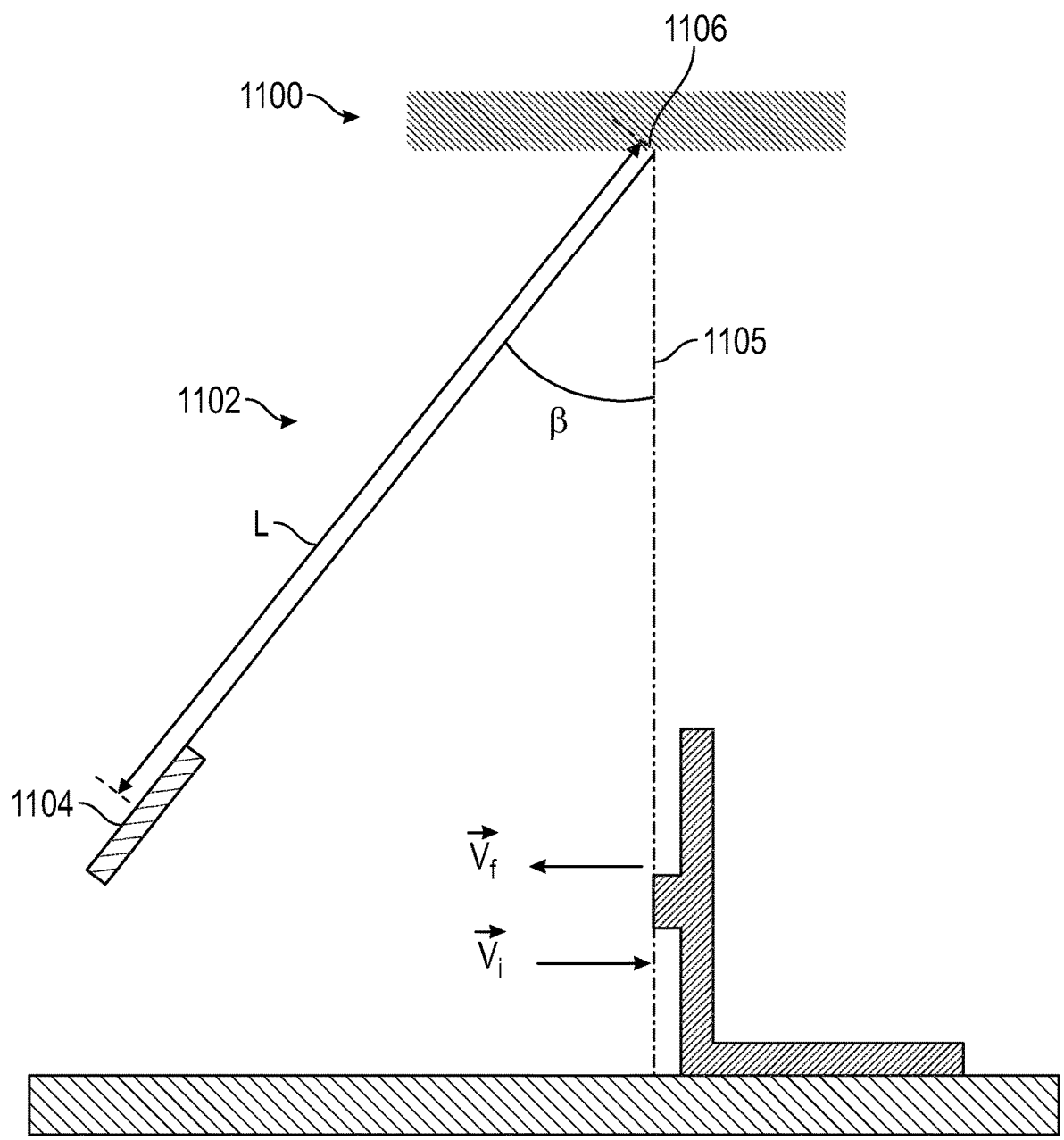
FIG. 9 is side schematic view of a testing apparatus according to one or more embodiments of this disclosure.

Referring now to FIGS. 5-9, an embodiment of an apparatus 1100 for impact testing a specimen is shown as comprising a pendulum 1102 including a bob 1104 attached to a pivot 1106. As utilized herein, a "bob" on a pendulum is a weight suspended from and connected to a pivot by an arm. Thus, the bob 1104 shown is connected to the pivot 1106 by an arm 1108, which may be in the form of a string, a rod, or a plurality of rods, such as two rods as shown. As best shown in FIG. 9, the bob 1104 has an equilibrium position shown as dotted line 1105 such that the angle β is zero. In other words, in the equilibrium position the arm 1108 is not in a raised position.

In some embodiments, the bob 1104 can simply be the specimen to be tested, e.g., a specimen that is affixed to the lower end of the arm 1108. In one or more embodiments, the bob 1104 includes a base 1110 for receiving a specimen, and the specimen is affixed to the base. As shown in better detail in FIG. 10, the base 1110 for receiving a specimen 1112 having at least two ends 1114, 1116, an inner surface 1113 and an outer surface 1115. The base 1110 has a first end 1121 and a second end 1122, and a curved surface 1124 defining a radius of curvature between the first end 1121 and the second end 1122. The base 1110 can be any suitable material to provide a platform to secure a specimen for the test. Suitable materials for the base 1110 can include wood, metal, ceramic, plastic, or combinations thereof.

Figure 10:
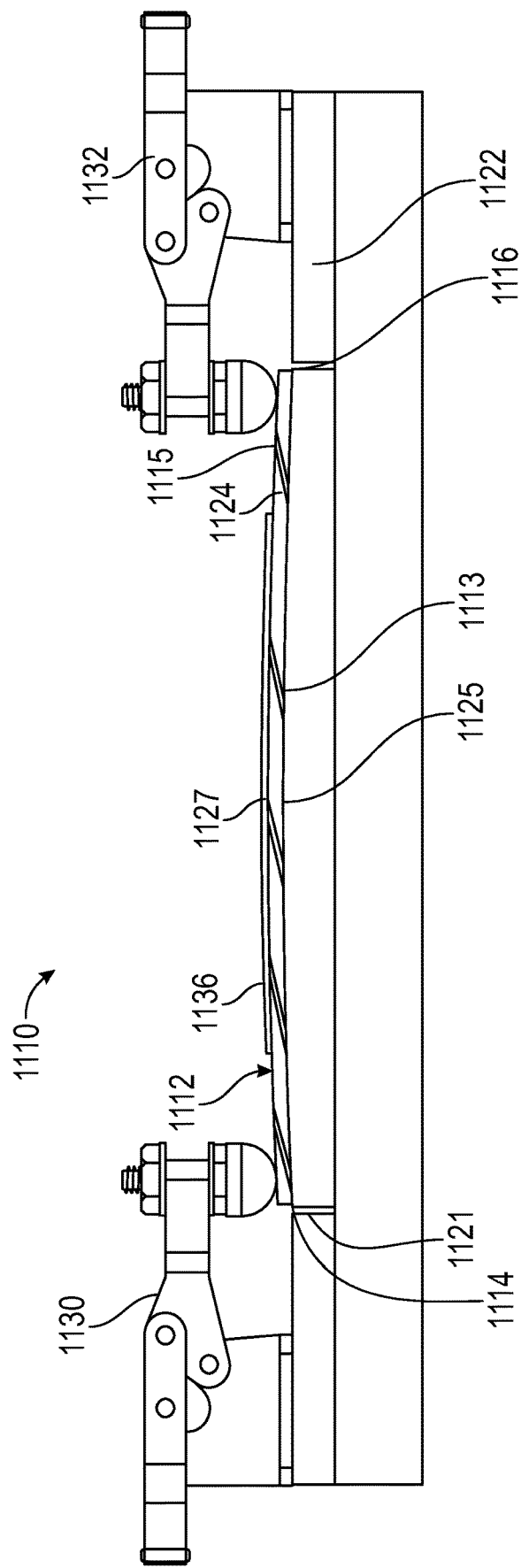
FIG. 10 is a detailed side view of a portion of the testing apparatus shown in FIG. 5.

The base 1110 according to one or more embodiments further includes a first fixture 1130 and a second fixture 1132 to hold the at least two ends 1114, 1116 of the specimen. In some embodiments, the fixtures 1130, 1132 may also apply a force to bend the specimen 1112 about the curved surface 1124 and to conform the specimen to the radius of curvature. By bending the specimen 1112, the specimen has an apex 1127 conforming to an apex 1125 of the curved surface 1124. In one or more specific embodiments, the curved surface 1124 and the curvature of the specimen 1112 can be a fixed radius or a compound radius. The first fixture 1130 and the second fixture 1132 may each independently be a clamp, and in specific embodiments are toggle clamps as shown in FIG. 10. However, other types of fixtures such as bar clamps, C-clamps, or other suitable fixtures to hold the ends of the specimen can be used.

The apparatus 1100 according to one or more embodiments may also include a roughened surface 1136, which can be provided by an abrasive sheet having an abrasive surface to be placed in contact with the outer surface of the specimen. In some embodiments, the abrasive sheet comprises sandpaper, which may have a grit size in the range of 30 grit to 400 grit, or 100 grit to 300 grit, for example 180 grit. A non-limiting example of a suitable sandpaper is Indasa Rhynowet® Plus Line P180 grit sandpaper. The sandpaper according to one or more embodiments is cut in 25 mm square pieces, and the sandpaper is flattened if the pieces are bent during the cutting process.

The apparatus 1100 further includes an impacting object 1140 positioned such that when the bob 1104 is released from a position at an angle greater than zero from the equilibrium position 1105, the surface of the bob 1104 contacts the impacting object 1140. In the embodiment shown, the impacting object 1140 is an L-shaped bracket affixed to platform 1142, and the impacting object 1140 is affixed to the platform 1142 by screw 1144. The impacting object 1140 could also be affixed by any other suitable mechanism such as a bolt, rivet, clamp, etc. The impacting object includes a stopper 1146, which permits the apparatus 1100 to be held at the end of work bench 1148. In the embodiment shown, the impacting object 1140 is fixed and does not move when the bob 1104 contacts the impacting object 1140 at impact surface 1150. The impact surface 1150 may be a separate element that is adjustable in the x-y plane as best seen in FIG. 8 within slot 1152 In one or more embodiments, the bob 1104 and base 1110 are sized and shaped such that when a specimen is affixed to the base 1110 and when the bob is released from a position at an angle greater than zero from the equilibrium position, the specimen is subjected to a bending radius and an impact force that simulates a bending radius of a chemically strengthened cover glass of a mobile phone or tablet device when the mobile phone or tablet device is dropped on a ground surface by a user of the mobile phone or tablet device.

In one or more embodiments the radius of curvature of the base is selected to provide a bending tensile force of 100 MPa when a specimen is bent around the base such that the tensile force is an externally applied tensile force that results from the stress of bending the specimen. Thus, when the specimen is bent, the tensile force is present at the apex 1125 of the specimen. According to one or more embodiments, the radius of curvature is in the range of from 0.25 m to 1.5 m, for example, in the range of from 0.5 m to 1 m.

In one or more embodiments, the first fixture 1130 and second fixture 1132 are spaced apart at a distance of a cover glass length for a mobile phone or a tablet. In specific embodiments, the first fixture and second fixture are spaced apart at a distance in the range of 50 mm and 500 mm.

Another aspect of the disclosure pertains to a method of impact testing a specimen, the method comprising: bending the sheet having a contact surface to provide a bent sheet having a radius of curvature and an apex on the contact surface; and impacting the bent specimen at the apex with an impacting object using a pendulum. In an embodiment, the bent specimen is attached to a pendulum bob. In an embodiment, the bent specimen attached to a pendulum bob is moved such that the contact surface contacts the apex. In one or more embodiments, the specimen comprises glass and the radius of curvature is in a range that simulates a bending radius of a chemically or thermally strengthened cover glass of a mobile phone or tablet device when the mobile phone or tablet device is dropped on a ground surface by a user of the mobile phone or tablet device.

In one or more embodiments, an abrasive sheet is placed in contact with the apex of the specimen prior to impacting the specimen at the apex. In one or more embodiments, the specimen is secured to a curved surface prior to impacting the apex with the impacting object.

Another embodiment pertains to a method of impact testing a specimen, the method comprising: attaching a specimen to a pendulum bob to expose a contact surface on the specimen; and moving the pendulum bob with the specimen attached to the pendulum bob to cause the contact surface to contact an impact object. In an embodiment, the specimen is a sheet, and the method includes bending the specimen to provide a bent specimen having a radius of curvature and an apex on the contact surface. In an embodiment, the bent specimen attached to a pendulum bob is moved such that the contact surface contacts the apex. In an embodiment, the specimen comprises glass and the radius of curvature is in a range that simulates a bending radius of a chemically or thermally strengthened cover glass of a mobile phone or tablet device when the mobile phone or tablet device is dropped on a ground surface by a user of the mobile phone or tablet device. In an embodiment, an abrasive sheet is placed in contact with the apex of the sheet prior to impacting the sheet at the apex. In an embodiment, the specimen is secured to a curved surface prior to impacting the apex with the impacting object.

Figure 5:
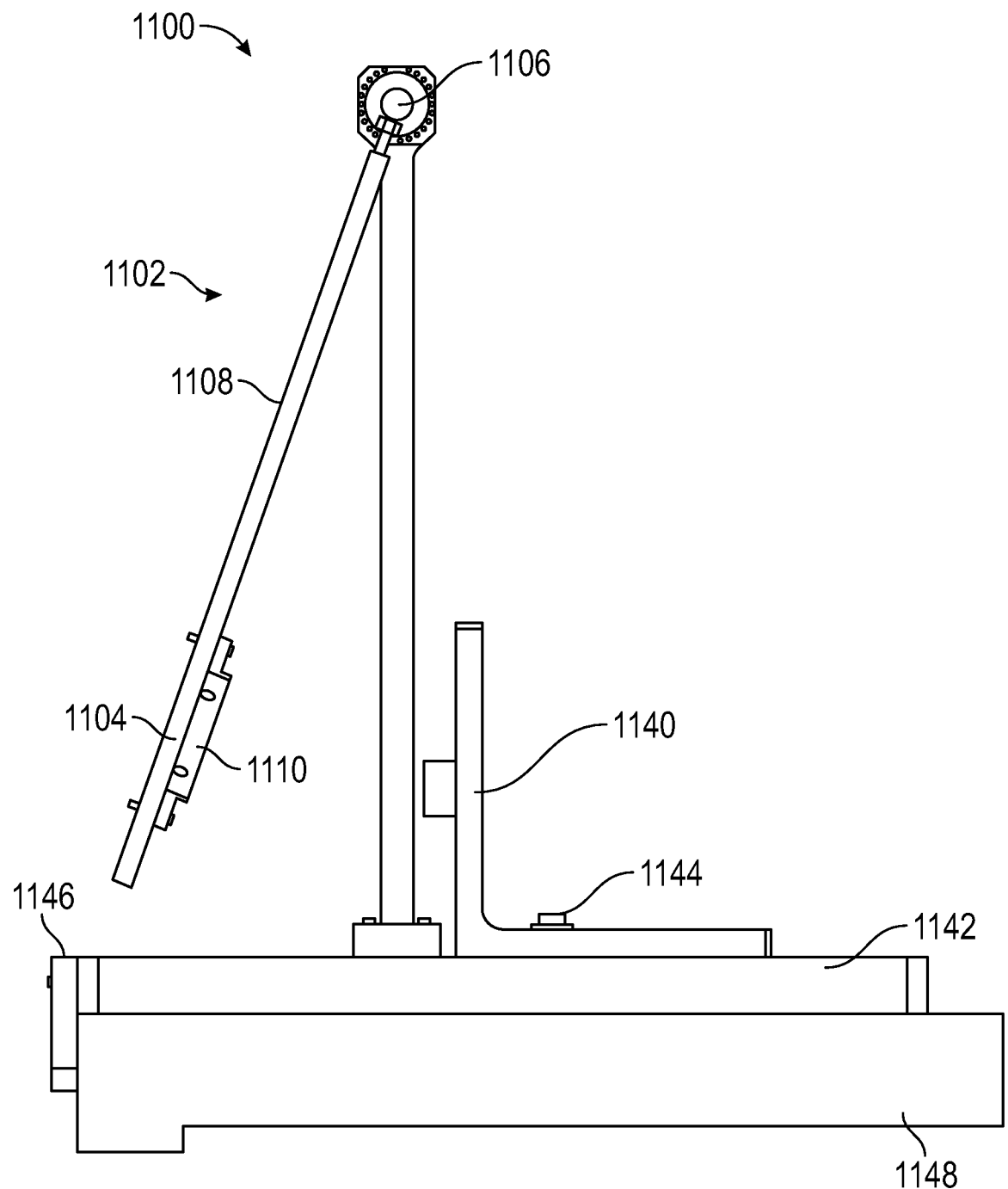
FIG. 5 is a side view of a testing apparatus according to one or more embodiments of this disclosure.
Figure 6:
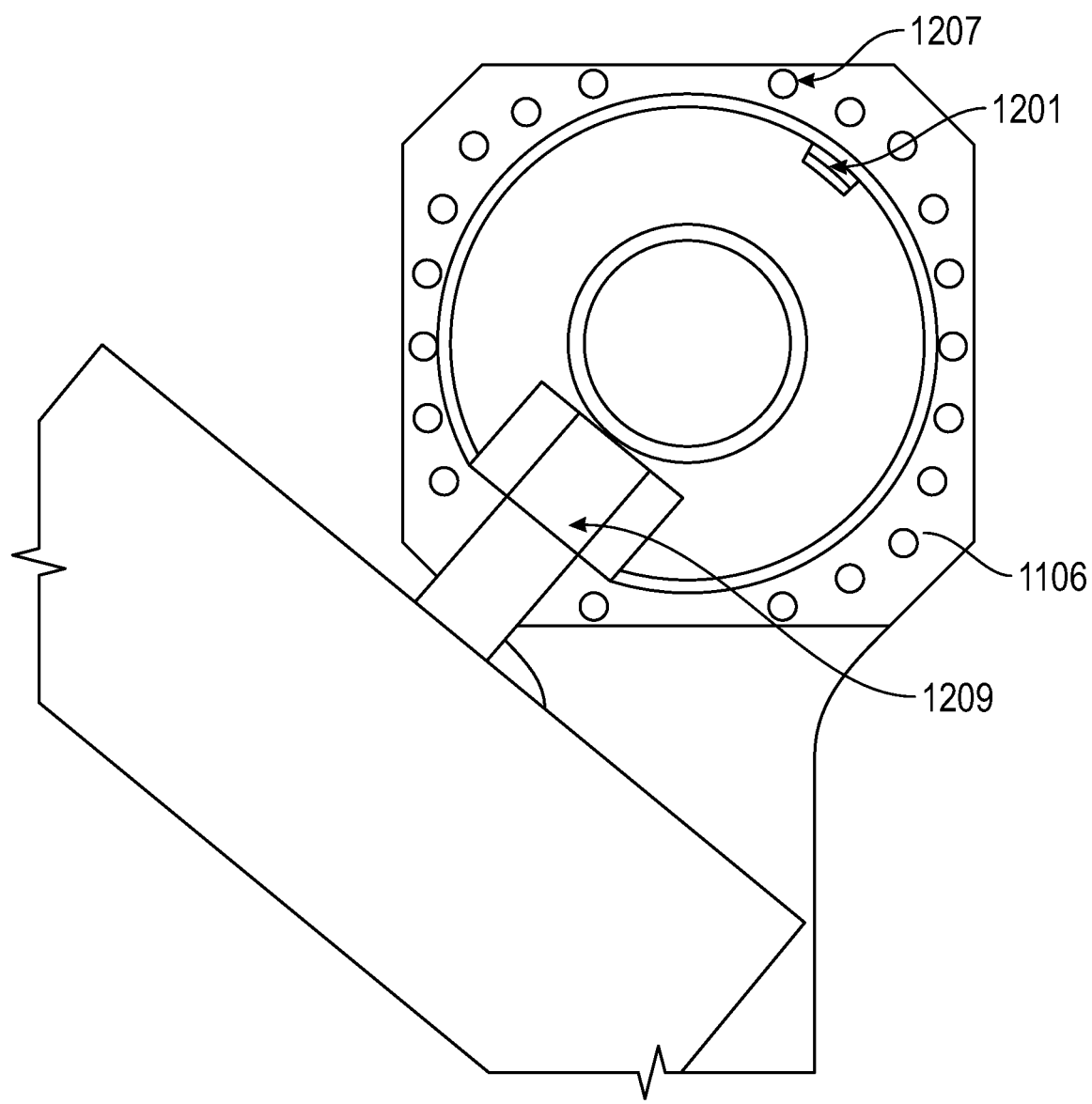
FIG. 6 is a detailed side view of a portion of the testing apparatus shown in FIG. 5.
Figure 7:
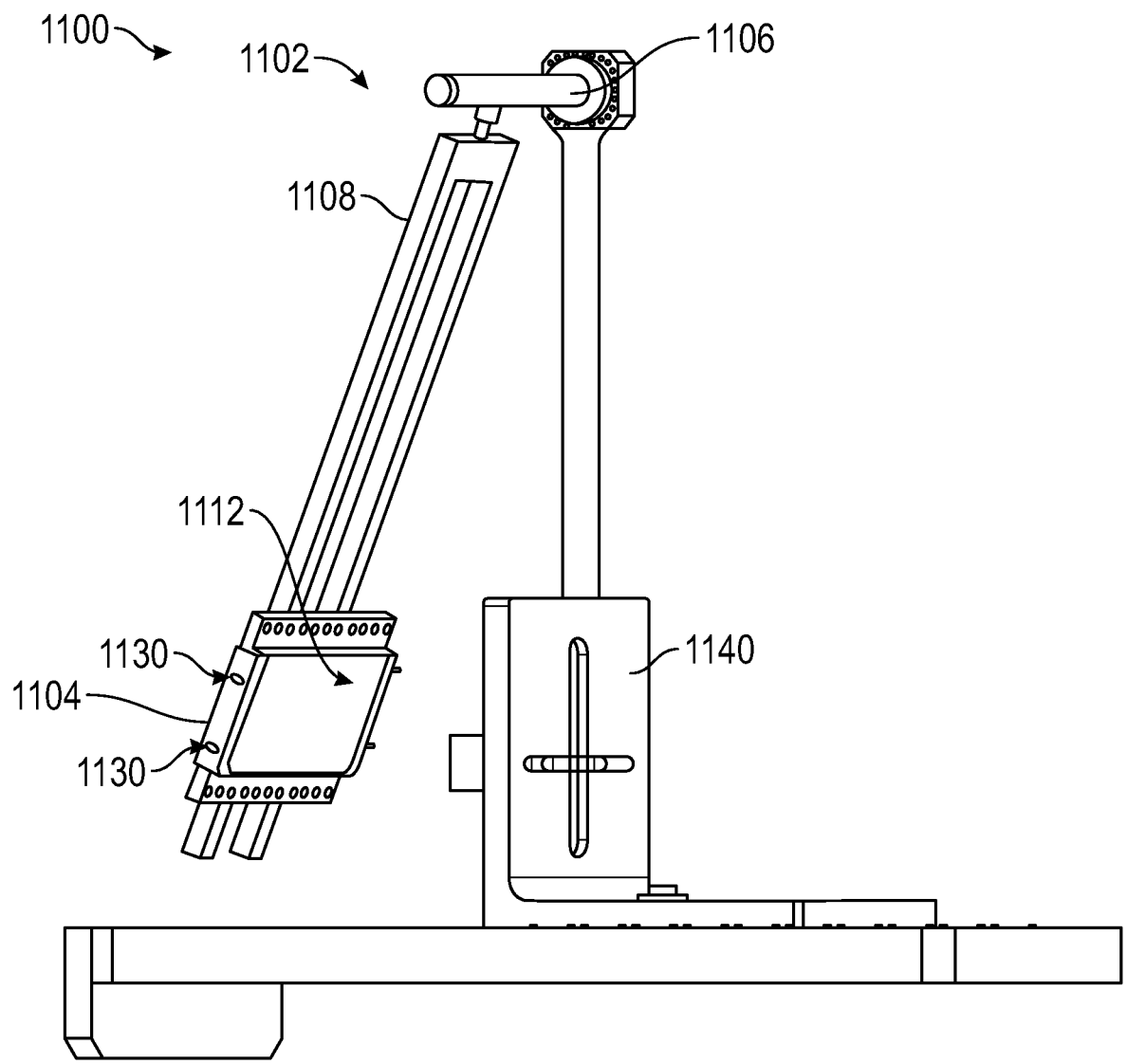
FIG. 7 is a rear perspective view of the testing apparatus shown in FIG. 5.

Referring now to FIGS. 5 and 6, specifically, non-limiting details of operation of the apparatus include a pointer notch 1201 on the pivot 1106, which can point to various test positions 1207. The arm is the part of the apparatus 1100 where the base 1110 is mounted and through which motion of the pendulum is initiated. The base provides a sample holder to hold specimens to be tested. Fixtures 1130, 1132 help secure the specimen to the apparatus 1100. The stopper 1146 helps secure the equipment to the workbench 1148 before, during and after impact. The pointer notch 1201 enables alignment with a variety of test positions 1207, which may be any suitable number of test positions between 1 and 50. In the embodiment shown, there are eleven test positions 1207. The apparatus 1100 may further include a lock 1209, which may be in the form of a nut to lock the arm 1108 in the desired test orientation.

The apparatus 1100 simulates an actual phone drop event according to one or more embodiments. Incident impact energy, E and average impact force, $\vec{F}_{avg}$ are provided by the equations:

$$E = mgL\{1 - \cos\beta\}, \text{ and}$$

$$|\vec{F}_{avg}| = \frac{m\vec{v}_f - m\vec{v}_i}{\Delta t},$$

respectively. Where, m=mass of swing (arm), L=length of arm, g=acceleration of free fall, vf and vi are final and initial impact velocities, respectively, and Δt=contact interaction time. When the mass and length of the swing arm are known, setting the angle β to a selected position, an impact force can be calculated and used to simulate impacts on a device when dropped from a specific height. For example, the average force experienced by a specimen cover glass on a 130 g mobile phone device when dropped from 1 meter height has been calculated to be 800 N. Using the mass, arm length and angle β, this force can be replicated using the apparatus and methods described herein.

Figure 11:
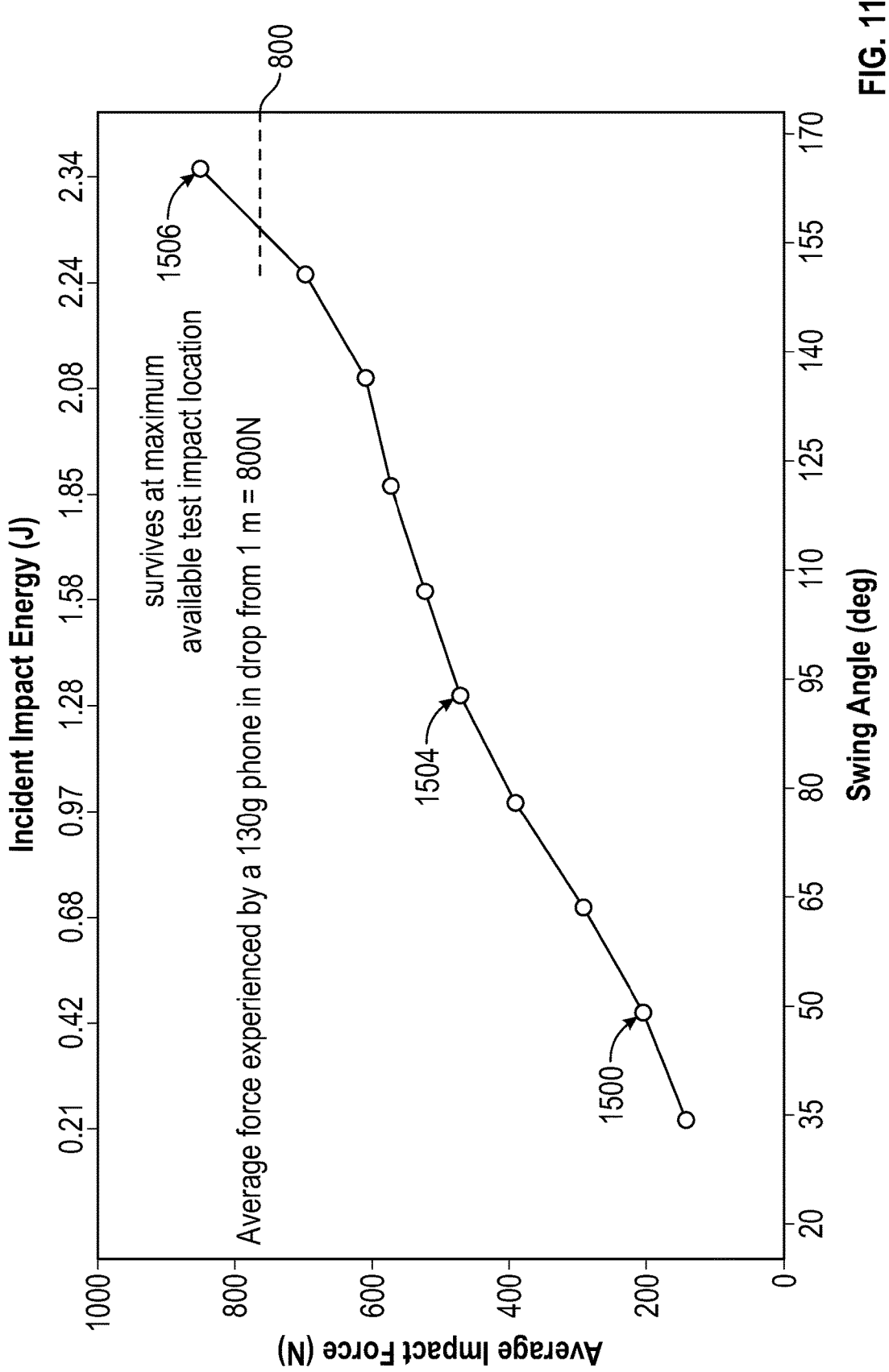
FIG. 11 is a graph of average impact force versus swing angle data obtained on the testing apparatus shown in FIG. 5 for various glass samples.
Figure 12:
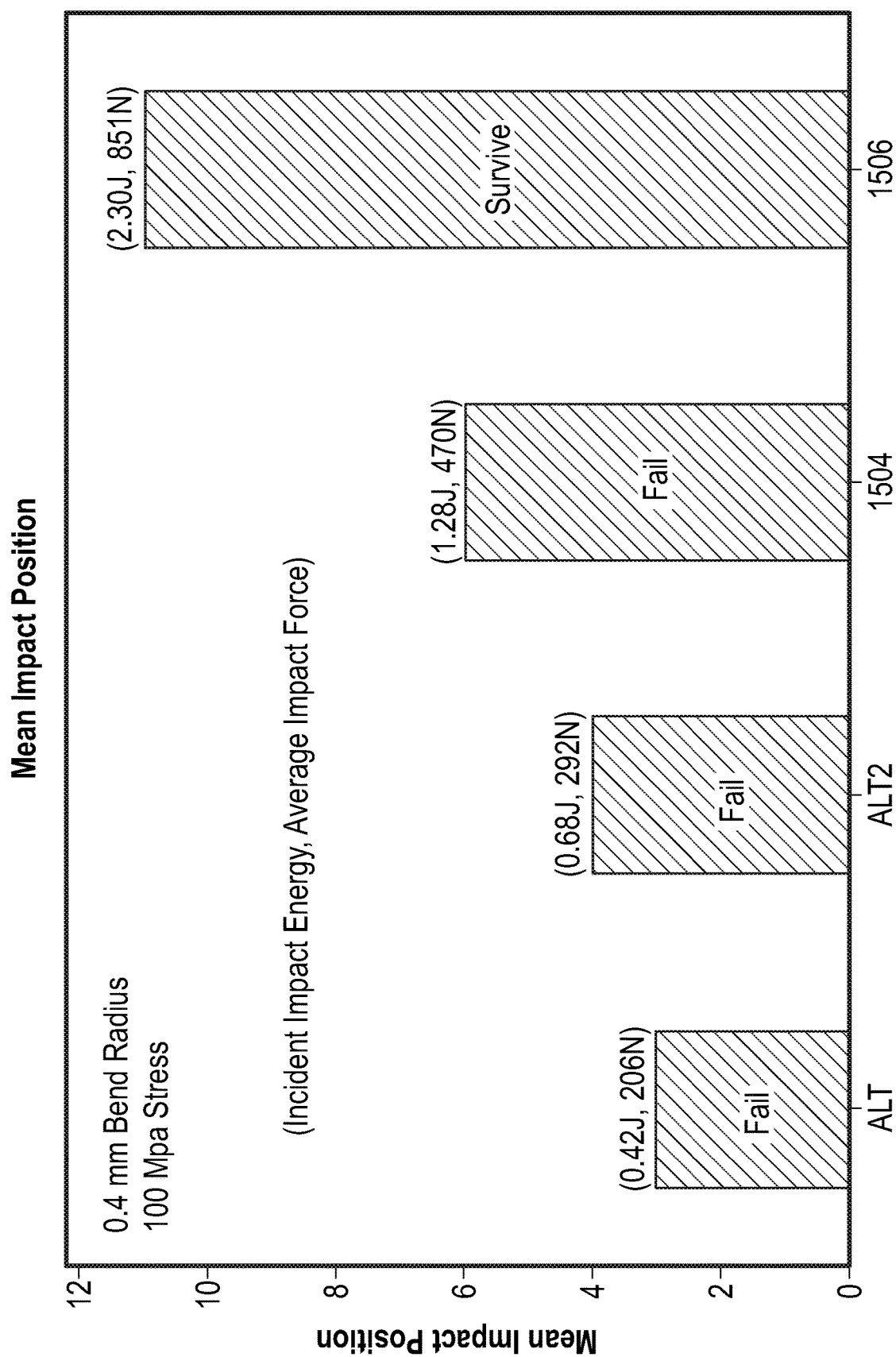
FIG. 12 is a bar graph of mean impact position data obtained on the testing apparatus shown in FIG. 5 for various glass samples.

Referring to FIG. 11, the point 1500 on the graph represents the failure threshold force for an aluminosilicate glass (ALT) specimen having a thickness of 0.5 mm that was tested on the apparatus shown in FIGS. 5-9. FIG. 11 shows the swing angle as correlated to the average impact force. The aluminosilicate glass (ALT) had a failure threshold force of about 200 Newtons. Point 1504 is for a 0.5 mm thick glass specimen having a nominal composition of 57.5 mol % $SiO_2$, 16.5 mol % $Al_2O_3$, 16.5 mol % $Na_2O$, 2.8 mol % MgO, 6.5 mol % $P_2O_5$, and 0.05 mol % $SnO_2$. The glass specimen from this test had a failure threshold of less than 500 Newtons. Data for the glass specimens described herein is shown as point 1506, and has an impact force exceeding 800 N. These values are plotted in FIG. 12, along with another chemically strengthened glass, labelled as ALT2 on FIG. 12. As indicated in FIG. 12, all glass specimens were tested with the pendulum apparatus 1100 shown in FIGS. 5-10, with a bend radius of 0.4 mm to impart an externally applied tensile stress at the apex of the glass specimen of 100 MPa.

Figure 13:
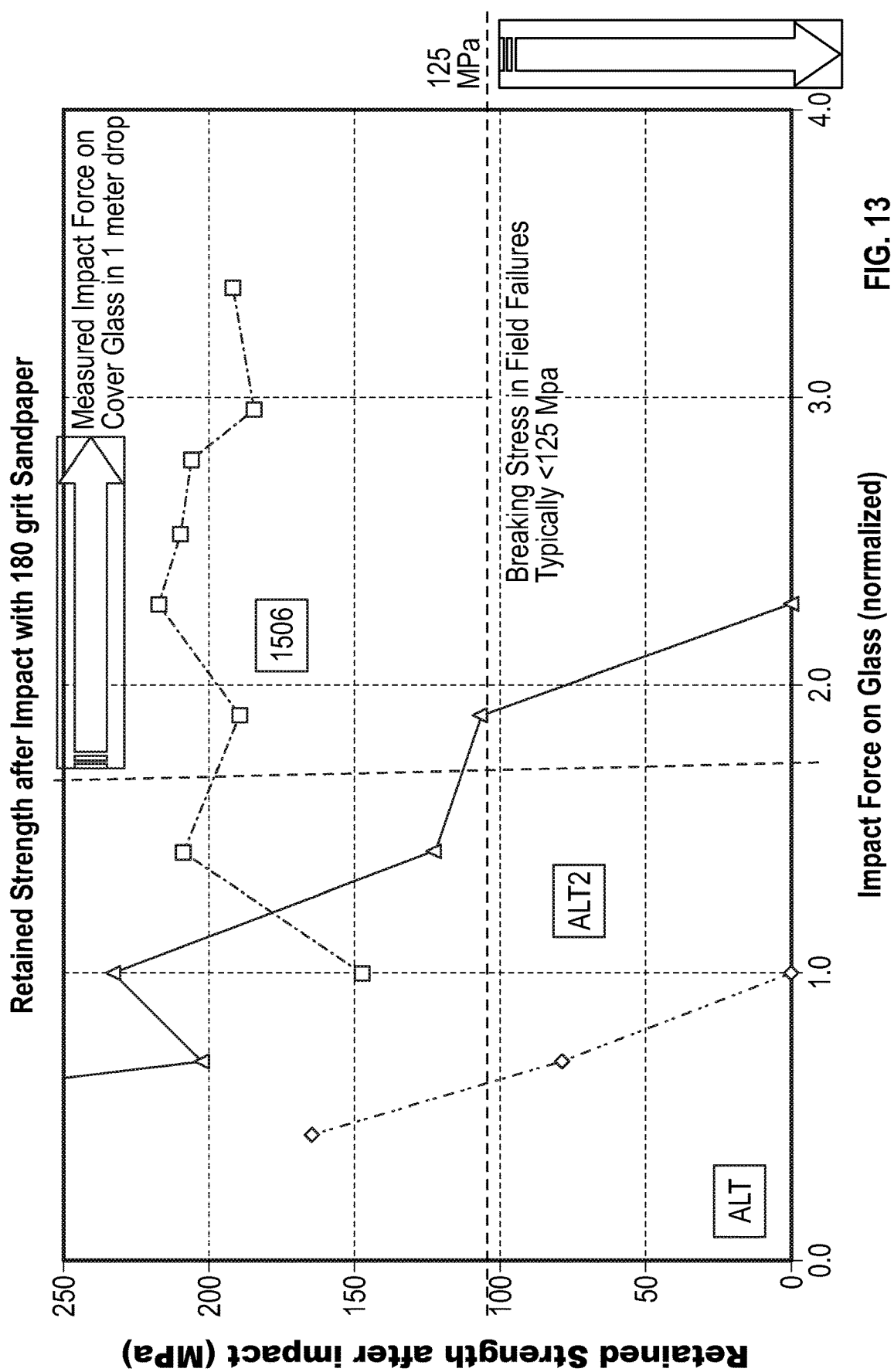
FIG. 13 is a graph showing retained strength values for various samples.

After the pendulum apparatus test was conducted on various samples, the samples were tested for strength, which is referred to on FIG. 13 as "Retained Strength", which refers to the strength of the specimen after being impacted by an impact force as specified when the specimen is bent to impart a tensile stress of 100 MPa. The retained strength values were measured using a four point bend test. In FIG. 13, the vertical dotted line represents an impact force of 800 N, and the impact forces to test samples were normalized on the x-axis. The ALT (diamond data points) had the worst retained strength values and could not be tested at the impact force of 800 N, as all parts failed at much lower impact forces. The ALT2 (triangle data points) glass specimens impacted with an impact force of 800 N did not have a retained strength greater than 125 N. However, the glass specimens described herein are shown as 1506 (square data points), and all had retained strength values exceeding 125 MPa, preferably greater than 150 MPa, and some greater than 200 MPa.

Another aspect of the disclosure pertains to a method and an apparatus for testing an edge of a specimen, for example, a glass-based specimen, such as a cover for mobile electronic devices, and simulates a failure mode that has been observed to occur in the field. The simulated failure mode includes a combination of bending and damage introduction. The method or apparatus may be referred to as an edge impact method or edge impact apparatus. One or more embodiments provide an apparatus for testing the finished edge of a specimen, for example, a cover glass for a mobile electronic device. The failure mode on the glass edge is associated with damage introduction, a new flaw that is introduced to the glass edge, and is simulated using an apparatus designed to impact the glass edge and create new damage.

Another aspect of the disclosure pertains to glass-based specimens or substrates demonstrating improved survivability after edge impacts. In specific embodiments, minimizing the magnitude of center tension near the edge mitigates fracture propagation across the cover glass. When the cover glass of mobile electronic devices fractures in the field, it is typically from drop events onto various surfaces, and in some cases the finished edge of the cover glass becomes the fracture initiation location site when the finished edge makes contact with surfaces such as asphalt, sidewalk, brick, etc.

Figure 14:
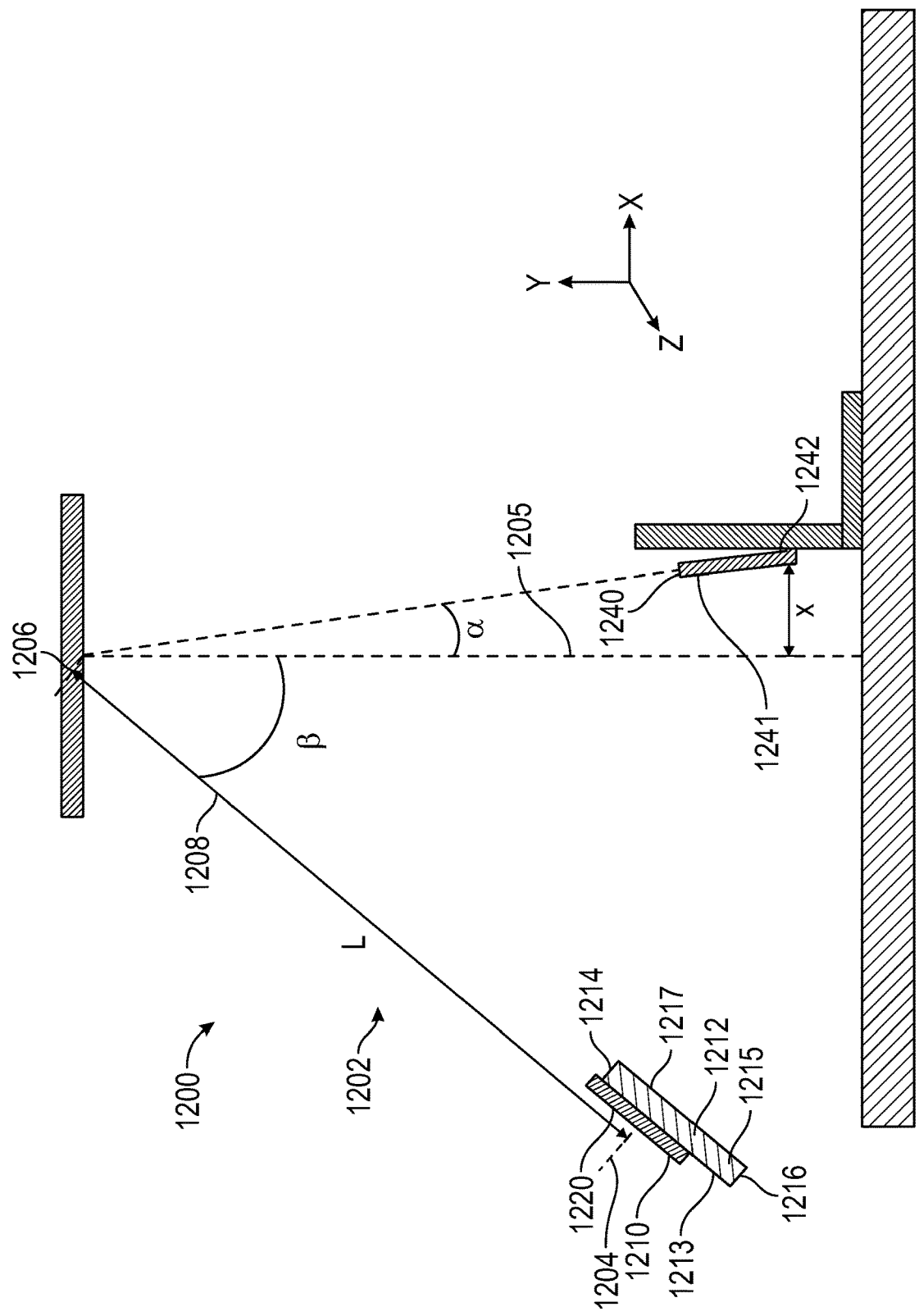
FIG. 14 is a side schematic view of an edge impact testing apparatus according to one or more embodiments of this disclosure.
Figure 15:
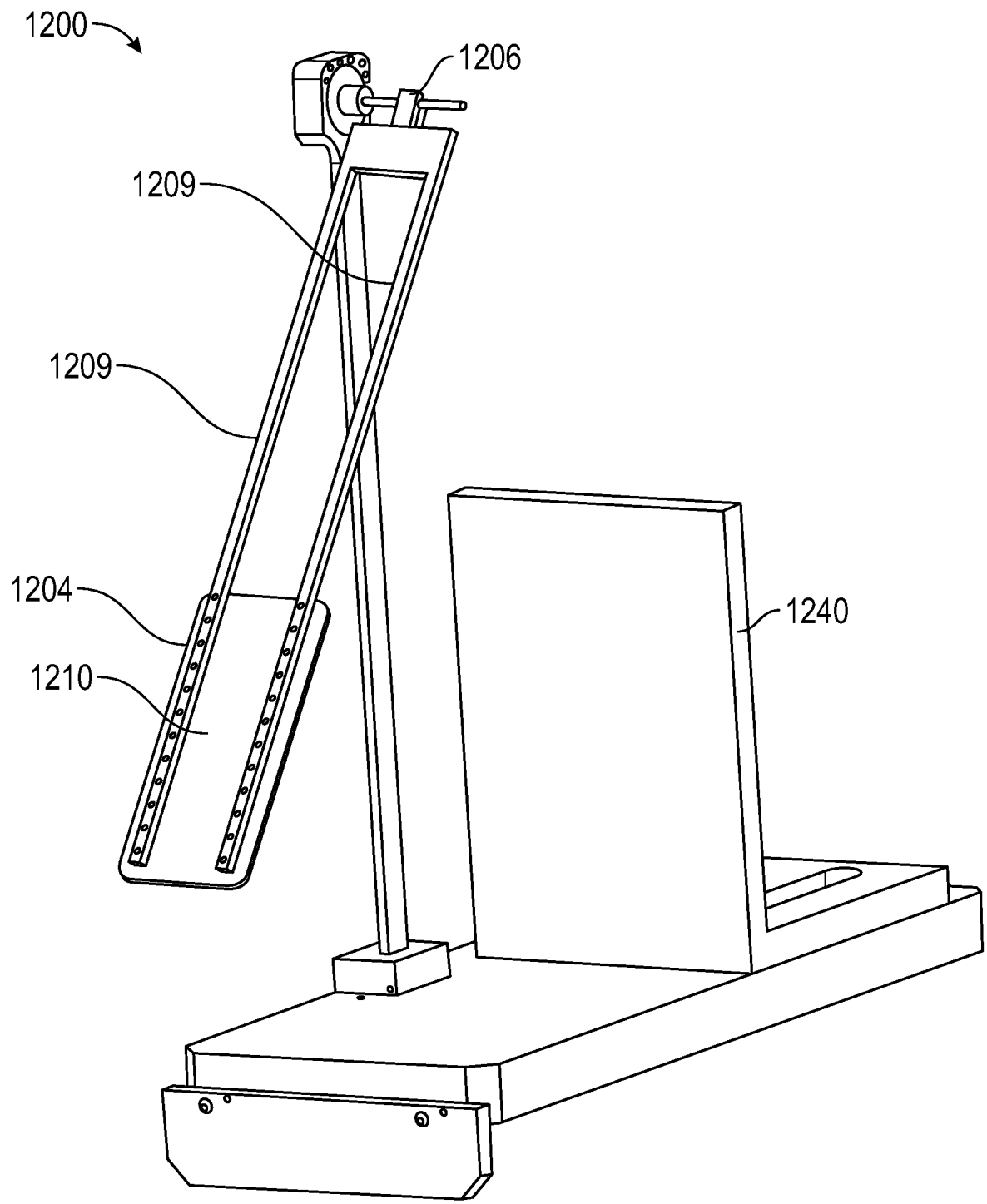
FIG. 15 is a rear perspective view of the edge impact testing shown in FIG. 14.

Referring now to FIGS. 14 and 15 an embodiment of an apparatus 1200 for edge impact testing an edge of a specimen, such as a sheet is shown. The embodiment of the apparatus 1200 shown in FIGS. 14 and 15 is substantially similar to the apparatus 1100 shown and described with respect to FIGS. 5-10, with the exception of the configuration of the base and the relative position of the impacting object and the specimen. In particular, the base, the impacting object, or both are positioned such that a specimen affixed to the bob of the pendulum will have an edge impacted against the impacting object. The apparatus 1200 in FIGS. 14 and 15 includes a pendulum 1202 including a bob 1204 attached to a pivot 1206, the bob 1204 having an equilibrium position shown as dotted line 1205 such that the angle β is zero. The apparatus 1200 further includes a base 1210 for receiving the specimen 1212 having at least two ends 1214, 1216, an inner surface 1213 and an outer surface 1215 and at least one edge 1217 between the inner surface 1213 and the outer surface 1215. The apparatus 1200 further includes a fixture 1220 to hold the specimen 1212 to the base 1210. The fixture 1220 can include clamps or any other suitable fixture device to affix the specimen 1212 to the base 1210. The base 1210 does not necessarily include an apex of the type shown in FIG. 10. The base may include one or more fixtures. The fixture may be a clamp, such as a toggle clamp. In some embodiments, the fixture may be a bar clamp, C-clamp, or other suitable fixture to hold the ends of the specimen. In one or more embodiments, the fixture can include an adhesive, such as glue, epoxy, velcro, or adhesive tape to adhere the specimen 1212 to the base 1210.

The apparatus 1200 further includes an impacting object 1240 positioned such that when the bob 1204 is released from a position at an angle β greater than zero from the equilibrium position 1205, the edge 1217 of the specimen 1212 attached to the bob 1204 contacts the impacting object 1240. The bob 1204 is connected to the pivot 1206 by movable arm 1208, which may be in the form of a string, a rod, or a plurality of rods, such as the two rods 1209 shown in FIG. 15. The bob 1204 can comprise the specimen 1212 that is affixed to the lower end of the arm 1208. In one or more embodiments, the bob 1204 includes the base 1210 and the specimen 1212.

In one or more embodiments, the impacting object 1240 is fixed and does not move when the glass specimen contacts the impacting object 1240. The impacting object 1240 according to one or more embodiments includes a roughened surface 1241 that contacts the edge of the glass specimen upon impact. This roughened surface can be in the form of a piece of concrete, brick, or granite, or an abrasive sheet, such as sandpaper, affixed to the impacting object 1240. In a specific embodiment, the roughened surface 1241 comprises an abrasive sheet having an abrasive surface positioned to be placed in contact with the edge of the specimen.

In one or more embodiments, the base 1210 is configured such that the specimen 1212 is held at an angle with respect to the arm 1208 such that the edge of the specimen contacts the impacting object 1240. In one or more embodiments, a portion of the impacting object 1240 is positioned at an angle with respect to the equilibrium position 1205 of the bob 1204 so that the edge 1217 of the specimen 1212 contacts the impacting object 1240 as shown in FIG. 14. This can be accomplished by providing an impacting object 1240 that is wedge-shaped, or the impacting object 1240 can be moved to different angular positions with respect to the equilibrium position 1205 of the bob 1204. For example, the impacting object 1240 can be mounted on a rotation point 1242, such as a hinge. The rotation point 1242 or hinge can be fixed in place by any suitable way, such as by threads and fasteners, detents, or clamps. In one or more embodiments, the impacting object 1240 can be mounted on the rotation point 1242 or hinge, for example, using clamps, adhesive or any other suitable way to fix the impacting object to the rotation point 1242 or hinge.

According to one or more embodiments, the bob 1204 can swivel clockwise and anticlockwise around the major axis of the arm, and this rotation can be locked to keep the impact orientation fixed. The impacting object 1240 can be moved back and forth to also allow flexibility of impact position/adjustment of impact energy, and to provide an angle with respect to the equilibrium position 1205 such that the edge 1217 of the specimen 1212 impacts the impacting object 1240.

Figure 18:
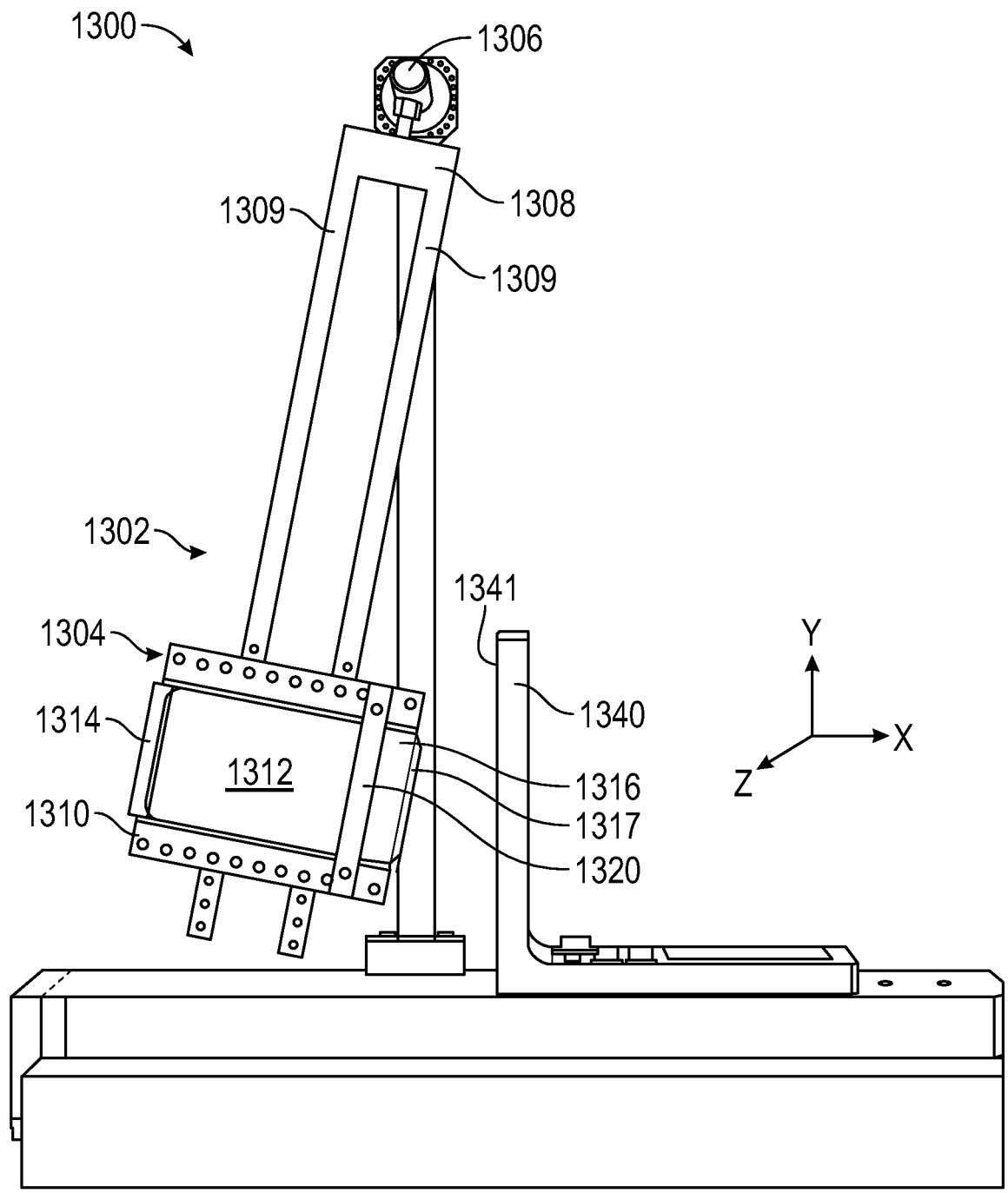
FIG. 18 is a side view of an alternative embodiment of an edge impact testing apparatus, according to one or more embodiments of this disclosure.

FIG. 18 shows another embodiment of an apparatus 1300 for edge impact testing an edge of a specimen, such as a sheet is shown. The embodiment of the apparatus 1300 shown in FIG. 18 is substantially similar to the apparatus 1200 shown and described with respect to FIG. 15, with the exception of the configuration of the base and the relative position of the impacting object and the test specimen, the position of the impacting object as described in more detail below. In particular, the base, the impacting object, or both are positioned such that a specimen affixed to the bob of the pendulum will have an edge impacted against the impacting object. The apparatus 1300 in FIG. 18 includes a pendulum 1302 including a bob 1304 attached to a pivot 1306, the bob 1304 having an equilibrium position similar to that shown in FIG. 14 such that angle β is zero. The apparatus 1300 further includes a base 1310 for receiving the specimen 1312 having at least two ends 1314, 1316, an inner surface and an outer surface and at least one edge 1317 between the inner surface and the outer surface. The apparatus 1300 further includes a fixture 1320 to hold the specimen 1312 to the base 1310. The fixture 1320 can include clamps or any other suitable fixture device to affix the specimen 1312 to the base 1310. There can be one or more fixtures, such as a clamp, and in specific embodiments toggle clamps. However, other types of fixtures such as bar clamps, C-clamps, or other suitable fixtures to hold the ends of the specimen can be used. In one or more embodiments, the fixture can include adhesive such as glue, epoxy, velcro, or adhesive tape to adhere the specimen 1312 to the base 1310.

The apparatus 1300 further includes an impacting object 1340 positioned such that when the bob 1304 is released from a position at an angle β greater than zero from the equilibrium position, the edge 1317 of the specimen 1312 attached to the bob 1304 contacts the impacting object 1340. The bob 1304 shown in FIG. 18 is connected to the pivot 1306 by movable arm 1308, which may be in the form of a string, or a rod or a plurality of rods, such as two rods 1309 as shown in FIG. 18. The bob 1304 can comprise the specimen 1312 that is affixed to the lower end of the arm 1308. In one or more embodiments, the bob 1304 includes the base 1310 and the specimen 1312.

In one or more embodiments, the impacting object 1340 is fixed and does not move when the glass specimen contacts the impacting object 1340. The impacting object 1340 according to one or more embodiments includes a roughened surface 1341 that contacts the edge of the glass specimen upon impact. This roughened surface can be in the form of a piece of concrete, brick, granite or an abrasive sheet such as sandpaper affixed to the impacting object 1340. In a specific embodiment, the roughened surface 1341 comprises an abrasive sheet having an abrasive surface positioned to be placed in contact with the edge of the specimen.

In one or more embodiments, the base 1310 is configured such that the specimen 1312 is held so that the specimen is substantially in the same plane as the two rods 1309, and the specimen 1312 is mounted in a flat relationship with the two rods 1309. In this configuration, the edge 1317 of the specimen 1312 directly contacts the impacting object 1340. Stated another way, in the embodiment shown, when the specimen 1312 is a sheet as shown, the plane of the sheet specimen is perpendicular to the plane of the impacting object 1340. Thus, if the planar surface of the impacting object 1340 is in the Y-Z plane of a Cartesian coordinate system, the plane of the specimen 1312 is in the X-Y plane. In FIG. 14 the plane of the specimen 1212 and the plane of the impacting object 1240 are in substantially the same Y-Z plane, and the impacting object can be tilted with respect to the Y-Z plane to cause edge 1217 to contact the impacting object 1240. Thus, in one or more embodiments the specimen 1312 is a sheet having a plane, and the impacting object 1340 defines a plane, and the fixture is configured to hold the specimen so that the plane of the specimen and the plane of the impacting object are different, and the at least one edge contacts the impacting object when the bob is released from a position at an angle greater than zero from the equilibrium position.

According to one or more embodiments, the bob 1304 can swivel clockwise and anticlockwise and the rotation of the bob may be locked to keep impact orientation fixed. The impacting object 1340 can be moved back and forth to also allow flexibility of impact position/adjustment of impact energy, and to provide an angle with respect to the equilibrium position such that the edge 1317 of the specimen 1312 impacts the impacting object 1340.

In existing testing apparatus for testing fracture of specimens, such as glass specimens in the form of a sheet, the specimen is stationary and an indenter/abrasive material is mobile, for example, a ball or other object is dropped on the specimen. In this case, not all the energy from the impacting object is absorbed by the glass, and some energy is lost due to the apparatus holding the specimen being impacted by unit rebound, and the absorbed energy of the specimen is overestimated In the embodiments described in the instant disclosure, however, the specimen is mobile and impacting object 1240 and roughened surface 1241 is stationary, which simulates the boundary condition of a substrate that has been dropped, for example, when the user of a mobile phone or electronic device drops the phone or device and it impacts the ground. The specimen impacts the impacting object, which can have an abrasive surface, with a specimen impact energy described by the equations immediately below.

$$E = mgL\{\cos\beta - \cos\alpha\}$$

$$E = mgL\left\{\cos\beta - \cos\left[\mathrm{Sin}^{-1}\left(\frac{x}{L}\right)\right]\right\},$$

where, referring to FIG. 14, E=incident impact energy, m=mass of swing (arm), L=length of arm, and g=acceleration of free fall. The angle β and angle α are shown in FIG. 14, with angle β as the angle of the swing arm with respect to the equilibrium position 1205 and angle α as the angle of the impacting object 1240 with respect to the equilibrium position 1205, while x is the distance of the impacting object 1240 at the rotation point 1242 from the equilibrium position 1205. When the mass and length of the swing arm are known, setting the angle β to a selected position, an impact force can be calculated and used to simulate impacts on a device when dropped from a specific height. For example, the average force experienced by a substrate cover glass on a 130 g mobile phone device when dropped from 1 meter height has been calculated to be 800 N. Using the mass, arm length and angle β, this force can be replicated using the apparatus and methods described herein. In this case, energy loss (due air resistance of swing arm) is very minimal, and may be neglected.

Additional embodiments of the disclosure pertain to methods of impact testing specimens at an edge thereof. In a first embodiment, a method of impact testing an edge of a specimen comprises affixing a specimen having an edge to a moving arm and impacting the edge of the specimen with an impacting object using a pendulum, for example, using the apparatus shown in FIGS. 14, 15, and 18. In one variant, the specimen is affixed to an end of a pendulum arm to provide a pendulum bob. In some embodiments, the pendulum bob is moved such that the contact surface contacts the edge of the sheet. In some embodiments, the specimen is glass and the specimen is positioned at an angle with respect to the impacting object prior to impacting the edge of the sheet.

In some embodiments, an abrasive sheet is placed in contact with the impacting object prior to impacting the specimen at the edge. In some embodiments, the specimen is secured to a base at an angle to expose the edge prior to impacting the edge against the impacting object.

In another embodiment, a method of impact testing an edge of a specimen in the form of a sheet includes attaching a specimen to a base of a pendulum bob such that an edge surface of the sheet is exposed, and moving the pendulum bob with the specimen to cause the edge surface to contact an impacting object. In some embodiments, the method includes attaching the specimen to the base at an angle to expose the edge of the sheet. In some embodiments, the specimen attached to the base is moved such that the impacting object contacts the edge. In some embodiments, the specimen is glass and the specimen is positioned at an angle on the base prior to impacting the edge of the specimen against the impacting object. In some embodiments, an abrasive sheet is placed in contact with the impacting object prior to impacting the specimen at the edge. In some embodiments, the specimen is secured to the base to expose the edge prior to impacting the edge with the impacting object.

According to some embodiments, the swing impact on the glass edge simulates an impact collision between the glass edge and a hard surface that can result when a mobile electronic device is dropped. Experimental results indicate conditions relating to stress profile that promote fracture events across the cover glass as well as conditions relating the stress profile preferentially generate "chips" rather than fracture propagation across the screen. The chip response versus fracture response is dictated by the magnitude of center tension from the chemical strengthening stress profile (ion exchange).

Figure 16:
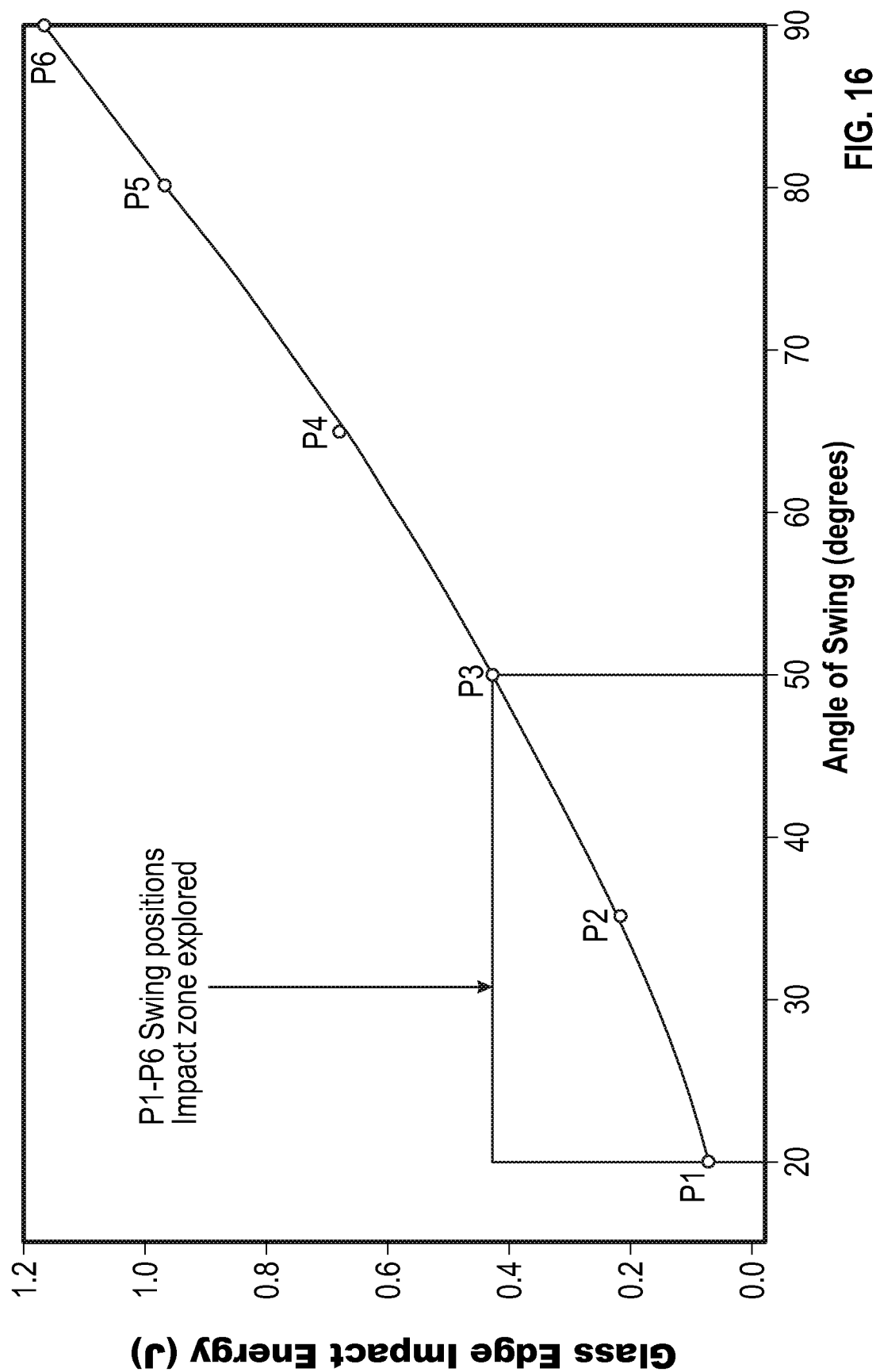
FIG. 16 is a graph showing glass edge impact energy versus angle of swing using the edge testing apparatus shown in FIG. 14.

FIG. 16 shows a scatterplot of glass edge impact energy in Joules (J) versus angle of swing. Swing position P1, 20 degrees resulted in an impact energy of 0.07 J of glass edge impact energy, while P2, at 35 degrees resulted in an impact energy of 0.21 J of glass edge impact energy, and P3, at 50 degrees resulted in an impact energy of 0.42 J of glass edge impact energy. Testing on various glass specimens having different central tension (CT) at the edges provided the following results.

Experimental results on two dimensional (2D-uniform thickness) and 2.5D shaped glass samples were tested on the edges as follows:

For CT (at edge)=0 MPa conditions (not strengthened):
0.07 Joule impact=chip but did not experience fracture propagation across the screen.
0.20 Joule impact=chip but did not experience fracture propagation across the screen.
0.4 Joule impact=chip but did not experience fracture propagation across the screen.

For CT (at edge)=~10 MPa conditions:
0.07 Joule impact=chip but did not experience fracture propagation across the screen.
0.20 Joule impact=chip but did not experience fracture propagation across the screen.
0.4 Joule impact=chip but did not experience fracture propagation across the screen For CT (at edge)=~30 MPa conditions:
0.07 Joule impact=fracture propagation across the screen.
0.20 Joule impact=fracture propagation across the screen.
0.4 Joule impact=fracture propagation across the screen For CT=>60 MPa conditions:
0.07 Joule impact=fracture propagation across the screen.
0.20 Joule impact=fracture propagation across the screen.
0.4 Joule impact=fracture propagation across the screen These results showed that the fracture mechanism in edge impact failure mode is due to new damage (flaw) introduced by contact between the edge and the impact object. For glass specimens with a relatively low CT, there is insufficient tension to propagate the crack across the screen. The source of tensile stress is limited to the contact stress from the impact event and the tension is immediately removed after the impact is over resulting in a chip only. For glass specimens with a relatively high CT, there is sufficient tension to propagate a "through crack" across the specimen. The onset threshold is at about CT=20 MPa for the crack tip created from the impact event to have sufficient tension to propagate.

Figure 17:
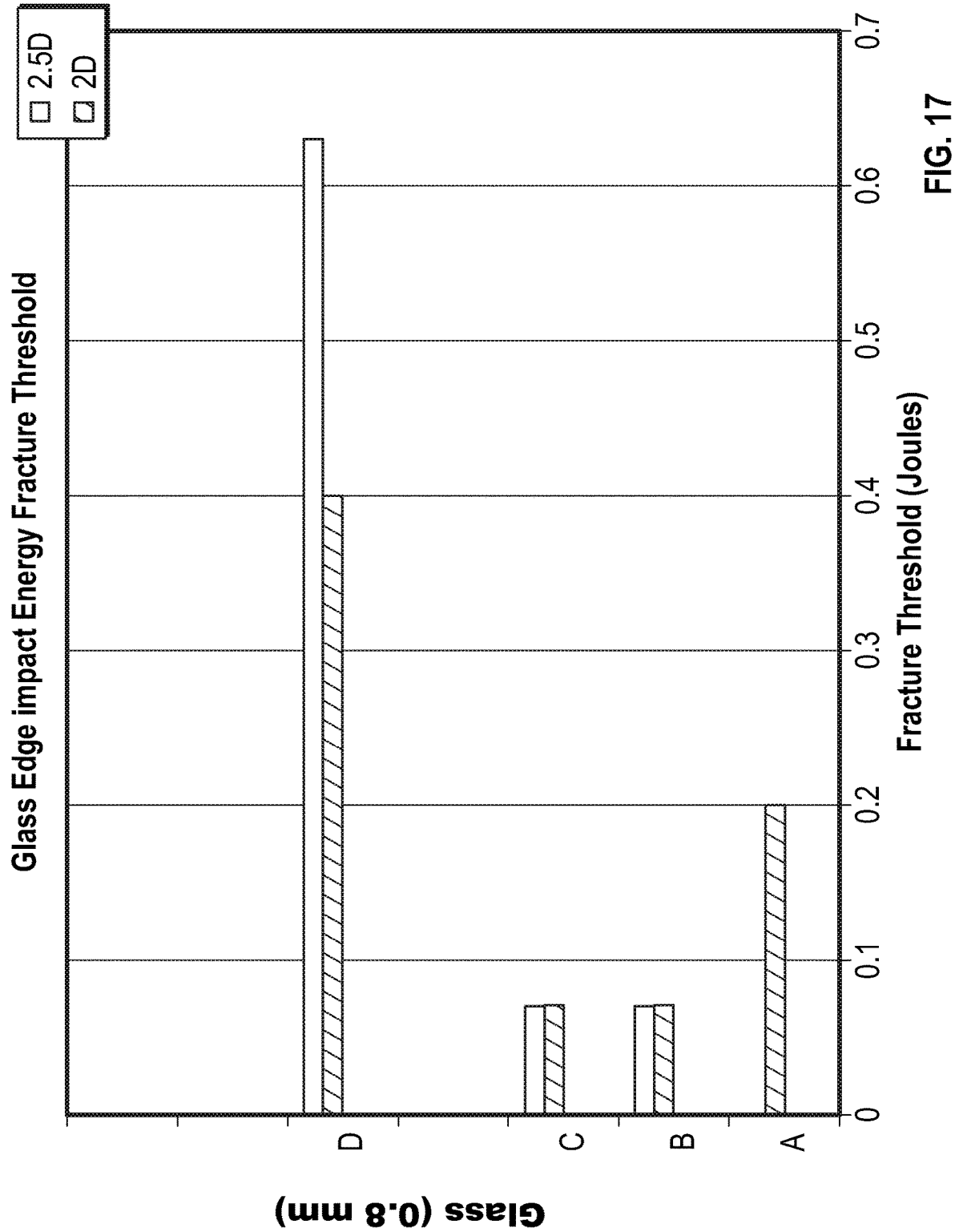
FIG. 17 is a graph showing glass edge impact energy fracture threshold for various glass samples.

FIG. 17 shows a graph of various glass samples that were tested using an edge impact apparatus as shown and described with respect to FIGS. 14 and 15

Sample A was an aluminosilicate glass that was not ion exchanged.

Sample B was an ion-exchanged aluminosilicate glass prepared in accordance with U.S. Pat. No. 9,517,967 having a nominal composition of 64.62 mol % $SiO_2$, 5.14 mol % $B_2O_3$, 13.97 mol % $Al_2O_3$, 13.79 mol % $Na_2O$, 2.4 mol % MgO, and 0.08 mol % $SnO_2$ and a central tension in a range of 60-70 MPa.

Sample C was a sample prepared in accordance with U.S. Pat. No. 9,156,724 having a nominal composition of 57.43 mol % $SiO_2$, 16.10 mol % $Al_2O_3$, 17.05 mol % $Na_2O$, 2.81 mol % MgO, 0.003 mol % $TiO_2$, 6.54 mol % $P_2O_5$, and 0.07 mol % $SnO_2$ and having a central tension in a range of 60-70 MPa.

Sample D is a glass having a nominal composition of 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$ and a central tension of about 40 MPa. Sample D was ion exchanged in a molten salt bath including 100% $NaNO_3$ and having a temperature of about 390° C. The ion exchange was such that the glass had a parabolic stress profile with compression spike at the surface.

Each of the samples above were prepared with flat glass samples (2D) and 2.5D samples having a curved edge. The results show that the 2.5D sample D, having a lower CT than samples B and C, survives better than a 2D sample. Thus, a glass-based 2.5D article having a curved edge prepared in accordance with Sample D with a central tension in a range of 5 to 40 MPa has a greater edge impact resistance to failure than samples B and C.

It will be apparent to those skilled in the art that various modifications and variations can be made without departing from the spirit or scope of the invention.

What is claimed is:

1. An apparatus comprising:
  a pendulum including a bob attached to a pivot, wherein the bob has an equilibrium position and wherein the bob includes a base configured to secure a specimen having at least two ends, an inner surface and an outer surface and at least one edge; and
  an impacting object positioned with respect to the bob, and
  a fixture to hold the specimen to the base in a position such that when the bob is released from a position at an angle greater than zero from the equilibrium position the bob moves toward the impacting object such that the at least one edge contacts the impacting object;
    wherein the impacting object further comprises a wedge-shape extending from the impacting object, wherein the wedge-shape can be moved to different angular positions with respect to the impacting object when the impacting object is fixed with respect to the equilibrium position of the bob.

2. The apparatus of claim 1, wherein the impacting object is fixed and does not move when the specimen contacts the impacting object.

3. The apparatus of claim 1, wherein the impacting object includes a roughened surface.

4. The apparatus of claim 3, wherein the roughened surface comprises an abrasive sheet having an abrasive surface positioned to be placed in contact with the edge of the specimen.

5. The apparatus of claim 4, wherein the abrasive sheet comprises sandpaper having a grit size of about 180.

6. The apparatus of claim 1, wherein the specimen is a sheet having a plane, the impacting object defines a plane, and the fixture is configured to hold the specimen so that the plane of the specimen and the plane of the impacting object are different, and the at least one edge contacts the impacting object when the bob is released from a position at an angle greater than zero from the equilibrium position.

7. The apparatus of claim 1, wherein the bob and the base are connected to the pivot by a rod.

8. The apparatus of claim 1, wherein the base is configured such that the specimen is held at an angle with respect to the impacting object such that the edge of the specimen contacts the impacting object.

9. The apparatus of claim 1, wherein a portion of the impacting object is positioned at an angle with respect to the equilibrium position of the bob.

10. The apparatus of claim 1, wherein the impacting object is mounted on a hinge.

11. An apparatus comprising:
  a pendulum including a bob attached to a pivot, the bob including a specimen; and
  an impacting object positioned with respect to the bob, such that when the bob is released to move towards the impacting object, an edge of the specimen contacts the impacting object;
  wherein the impacting object further comprises a wedge-shape extending from the impacting object, wherein the wedge-shape can be moved to different angular positions with respect to the impacting object when the impacting object is fixed with respect to the equilibrium position of the bob.

12. A method, comprising:
  attaching a specimen having at least two ends, an inner surface and an outer surface and at least one edge to a bob, wherein the bob is attached to a pivot to form a pendulum; and
  releasing the bob from a non-equilibrium position such that the bob moves towards an impacting object and the at least one edge of the specimen contacts the impacting object;
  wherein the impacting object further comprises a wedge-shape extending from the impacting object, wherein the wedge-shape can be moved to different angular positions with respect to the impacting object when the impacting object is fixed with respect to the equilibrium position of the bob.

13. The method of claim 12, wherein the bob includes a base configured to secure the specimen.

14. The method of claim 13, wherein the base comprises a fixture to hold the specimen to the base in a position such that when the bob is released from a position at an angle greater than zero from an equilibrium position of the bob, the bob moves toward the impacting object such that the at least one edge contacts the impacting object.

15. The method of claim 14, further comprising attaching the specimen to the base with the fixture.

16. The method of claim 12, wherein the at least one edge of the specimen contacts a roughened surface.

17. The method of claim 16, wherein the roughened surface comprises an abrasive sheet disposed between the at least one edge of the specimen and the impacting object.

18. The method of claim 17, wherein the abrasive sheet is disposed on the impacting object.

\* \* \* \* \*

UNITED STATES PATENT AND TRADEMARK OFFICE
CERTIFICATE OF CORRECTION

PATENT NO. : 11,131,611 B2
APPLICATION NO. : 16/122214
DATED : September 28, 2021
INVENTOR(S) : Kameron Isaiah Chambliss et al.

Page 1 of 1

It is certified that error appears in the above-identified patent and that said Letters Patent is hereby corrected as shown below:

On the Title Page

In Column 2, item (56), Other Publications, Line 3, delete "Cofnerence," and insert -- Conference, --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*